United States Patent
Elshafie et al.

(10) Patent No.: US 12,207,232 B2
(45) Date of Patent: Jan. 21, 2025

(54) RESOURCE ALLOCATIONS TO SOURCE USER EQUIPMENT FROM A USER EQUIPMENT IN A HOP

(71) Applicant: QUALCOMM Incorporated, San Diego, CA (US)

(72) Inventors: Ahmed Elshafie, San Diego, CA (US); Yi Huang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 17/232,462

(22) Filed: Apr. 16, 2021

(65) Prior Publication Data
US 2022/0338169 A1    Oct. 20, 2022

(51) Int. Cl.
*H04W 40/22* (2009.01)
*H04W 72/02* (2009.01)

(52) U.S. Cl.
CPC ........... *H04W 72/02* (2013.01); *H04W 40/22* (2013.01)

(58) Field of Classification Search
CPC ..... H04W 72/02; H04W 40/22; H04W 72/04; H04W 88/08; H04W 76/00
See application file for complete search history.

(56) References Cited

U.S. PATENT DOCUMENTS

| | | | | |
|---|---|---|---|---|
| 10,630,410 | B2 * | 4/2020 | Parkvall | H04L 5/0053 |
| 10,638,497 | B2 * | 4/2020 | Islam | H04L 5/0094 |
| 2009/0175214 | A1 * | 7/2009 | Sfar | H04J 11/0053 370/315 |
| 2009/0285088 | A1 * | 11/2009 | Feng | H04B 7/15507 370/216 |
| 2010/0278136 | A1 * | 11/2010 | Oyman | H04W 52/146 370/330 |
| 2012/0250494 | A1 * | 10/2012 | Rong | H04L 47/522 370/216 |
| 2014/0010175 | A1 * | 1/2014 | Chiu | H04W 72/23 370/329 |
| 2014/0313997 | A1 * | 10/2014 | Xu | H04L 27/2613 370/329 |
| 2015/0382351 | A1 * | 12/2015 | Lim | H04L 5/0098 370/336 |

(Continued)

FOREIGN PATENT DOCUMENTS

WO    2010051828    *    5/2010    ............ H04W 40/22

*Primary Examiner* — Hassan A Phillips
*Assistant Examiner* — Prenell P Jones
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a first source UE of two or more source UEs, an indication of a first resource allocation for transmitting first data. The UE may transmit, to a second source UE of the two or more source UEs, an indication of a second resource allocation for transmitting second data. The UE may receive, from the first source UE, the first data using the first resource allocation. The UE may receive, from the second source UE, the second data using the second resource allocation. The UE may transmit the first data and the second data to at least one destination UE. Numerous other aspects are described.

22 Claims, 13 Drawing Sheets

(56) References Cited

U.S. PATENT DOCUMENTS

| | | | | |
|---|---|---|---|---|
| 2016/0095074 A1* | 3/2016 | Park | ............... | H04W 56/001 |
| | | | | 370/350 |
| 2016/0150533 A1* | 5/2016 | Webb | ............... | H04W 72/044 |
| | | | | 370/329 |
| 2017/0142741 A1* | 5/2017 | Kaur | ............... | H04W 72/02 |
| 2017/0188410 A1* | 6/2017 | Yaver | ............... | H04W 72/541 |
| 2018/0077633 A1* | 3/2018 | Chae | ............... | H04W 48/16 |
| 2018/0116007 A1* | 4/2018 | Yasukawa | ......... | H04W 72/1263 |
| 2018/0139640 A1* | 5/2018 | Chae | ............... | H04L 25/0204 |
| 2018/0146491 A1* | 5/2018 | Kim | ............... | H04W 24/10 |
| 2018/0199312 A1* | 7/2018 | Wu | ............... | H04B 7/155 |
| 2019/0053203 A1* | 2/2019 | Xu | ............... | H04W 88/04 |
| 2019/0110207 A1* | 4/2019 | Makhijani | ............... | H04W 28/16 |
| 2019/0174530 A1* | 6/2019 | Kim | ............... | H04W 72/12 |
| 2019/0305923 A1* | 10/2019 | Luo | ............... | H04W 72/12 |
| 2020/0029308 A1* | 1/2020 | Tiirola | ............... | H04L 1/0075 |
| 2020/0037191 A1* | 1/2020 | Jang | ............... | H04L 5/0053 |
| 2020/0077434 A1* | 3/2020 | Kim | ............... | H04W 72/0446 |
| 2020/0252789 A1* | 8/2020 | Zheng | ............... | H04L 67/568 |
| 2020/0304940 A1* | 9/2020 | Thangarasa | ........... | H04W 8/005 |
| 2020/0351033 A1* | 11/2020 | Ryu | ............... | H04W 72/0453 |
| 2020/0396687 A1* | 12/2020 | Hwang | ............... | H04W 4/80 |
| 2020/0404560 A1* | 12/2020 | Zhang | ............... | H04W 72/0453 |
| 2021/0022116 A1* | 1/2021 | Lee | ............... | H04L 5/0044 |
| 2021/0136783 A1* | 5/2021 | Fakoorian | ............... | H04W 76/14 |
| 2021/0176669 A1* | 6/2021 | Fakoorian | ............... | H04L 5/0094 |
| 2021/0212025 A1* | 7/2021 | Selvanesan | ............ | H04W 76/14 |
| 2021/0219143 A1* | 7/2021 | Khalid | ............... | H04W 8/005 |
| 2021/0227508 A1* | 7/2021 | Lee | ............... | H04W 74/006 |
| 2021/0235428 A1* | 7/2021 | Zhang | ............... | H04B 7/086 |
| 2021/0241925 A1* | 8/2021 | Cho | ............... | H04L 67/53 |
| 2021/0266212 A1* | 8/2021 | Chae | ............... | G01S 5/06 |
| 2021/0297128 A1* | 9/2021 | Badic | ............... | H04W 72/20 |
| 2021/0306824 A1* | 9/2021 | Li | ............... | H04W 4/40 |
| 2021/0306953 A1* | 9/2021 | Hwang | ............... | H04W 68/02 |
| 2021/0307032 A1* | 9/2021 | Osawa | ............... | H04W 72/1263 |
| 2022/0038554 A1* | 2/2022 | Merwaday | ............ | H04L 67/63 |
| 2022/0039140 A1* | 2/2022 | Yi | ............... | H04L 1/08 |
| 2022/0061095 A1* | 2/2022 | Xue | ............... | H04W 72/02 |
| 2022/0085923 A1* | 3/2022 | Ye | ............... | H04L 1/1825 |
| 2022/0095278 A1* | 3/2022 | Kim | ............... | H04L 5/00 |
| 2022/0104215 A1* | 3/2022 | Luo | ............... | H04W 72/542 |
| 2022/0210768 A1* | 6/2022 | Zhou | ............... | H04W 4/40 |
| 2022/0256539 A1* | 8/2022 | Xue | ............... | H04W 72/02 |
| 2022/0256542 A1* | 8/2022 | Futaki | ............... | H04W 72/12 |
| 2022/0264530 A1* | 8/2022 | Elshafie | ............... | H04L 1/1854 |
| 2022/0330304 A1* | 10/2022 | Hahn | ............... | H04W 72/121 |
| 2023/0026021 A1* | 1/2023 | Liang | ............... | H04W 40/12 |
| 2023/0084482 A1* | 3/2023 | Xu | ............... | H04W 16/28 |
| 2023/0171793 A1* | 6/2023 | Kim | ............... | H04L 5/0055 |
| | | | | 370/329 |
| 2024/0080863 A1* | 3/2024 | Yang | ............... | H04W 72/0446 |

* cited by examiner

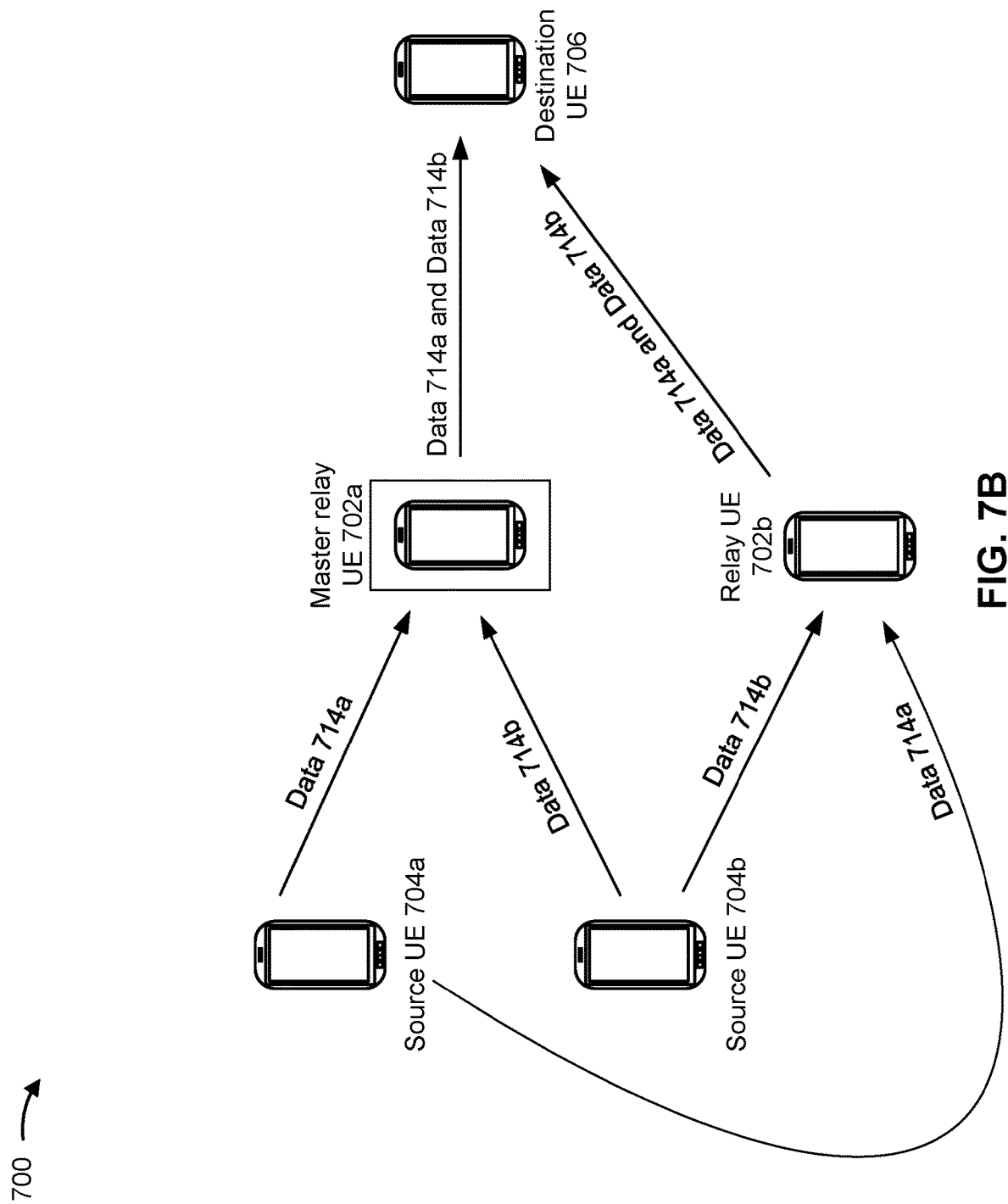

RESOURCE ALLOCATIONS TO SOURCE USER EQUIPMENT FROM A USER EQUIPMENT IN A HOP

FIELD OF THE DISCLOSURE

Aspects of the present disclosure generally relate to wireless communication and to techniques and apparatuses for allocating resources to source user equipment (UEs) from a UE in a hop.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication on a hop includes a memory and one or more processors coupled to the memory, the memory and the one or more processors configured to transmit, to a first source UE of two or more source UEs, an indication of a first resource allocation for transmitting first data; transmit, to a second source UE of the two or more source UEs, an indication of a second resource allocation for transmitting second data; receive, from the first source UE, the first data using the first resource allocation; receive, from the second source UE, the second data using the second resource allocation; and transmit the first data and the second data to at least one destination UE.

In some aspects, a UE for wireless communication includes a memory and one or more processors coupled to the memory, the memory and the one or more processors configured to transmit, to a first relay UE, a first report based at least in part on a sidelink channel between the UE and the first relay UE; receive, from the first relay UE, an indication of a first resource allocation based at least in part on the first report; and transmit, to the first relay UE, first data using the first resource allocation.

In some aspects, a method of wireless communication performed by a UE on a hop includes transmitting, to a first source UE of two or more source UEs, an indication of a first resource allocation for transmitting first data; transmitting, to a second source UE of the two or more source UEs, an indication of a second resource allocation for transmitting second data; receiving, from the first source UE, the first data using the first resource allocation; receiving, from the second source UE, the second data using the second resource allocation; and transmitting the first data and the second data to at least one destination UE.

In some aspects, a method of wireless communication performed by a UE includes transmitting, to a first relay UE, a first report based at least in part on a sidelink channel between the UE and the first relay UE; receiving, from the first relay UE, an indication of a first resource allocation based at least in part on the first report; and transmitting, to the first relay UE, first data using the first resource allocation.

In some aspects, a non-transitory computer-readable medium storing a set of instructions for wireless communication includes one or more instructions that, when executed by one or more processors of a UE, cause the UE to transmit, to a first source UE of two or more source UEs, an indication of a first resource allocation for transmitting first data; transmit, to a second source UE of the two or more source UEs, an indication of a second resource allocation for transmitting second data; receive, from the first source UE, the first data using the first resource allocation; receive, from the second source UE, the second data using the second resource allocation; and transmit the first data and the second data to at least one destination UE.

In some aspects, a non-transitory computer-readable medium storing a set of instructions for wireless communication includes one or more instructions that, when executed by one or more processors of a UE, cause the UE to transmit, to a first relay UE, a first report based at least in part on a sidelink channel between the UE and the first relay UE; receive, from the first relay UE, an indication of a first resource allocation based at least in part on the first report; and transmit, to the first relay UE, first data using the first resource allocation.

In some aspects, an apparatus for wireless communication includes means for transmitting, to a first source UE of two or more source UEs, an indication of a first resource allocation for transmitting first data; means for transmitting, to a second source UE of the two or more source UEs, an indication of a second resource allocation for transmitting second data; means for receiving, from the first source UE, the first data using the first resource allocation; means for receiving, from the second source UE, the second data using the second resource allocation; and means for transmitting the first data and the second data to at least one destination UE.

In some aspects, an apparatus for wireless communication includes means for transmitting, to a first relay UE, a first report based at least in part on a sidelink channel between the apparatus and the first relay UE; means for receiving, from the first relay UE, an indication of a first resource allocation based at least in part on the first report; and means for transmitting, to the first relay UE, first data using the first resource allocation.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7A and 7B are diagrams illustrating an example associated with a master UE within a hop, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
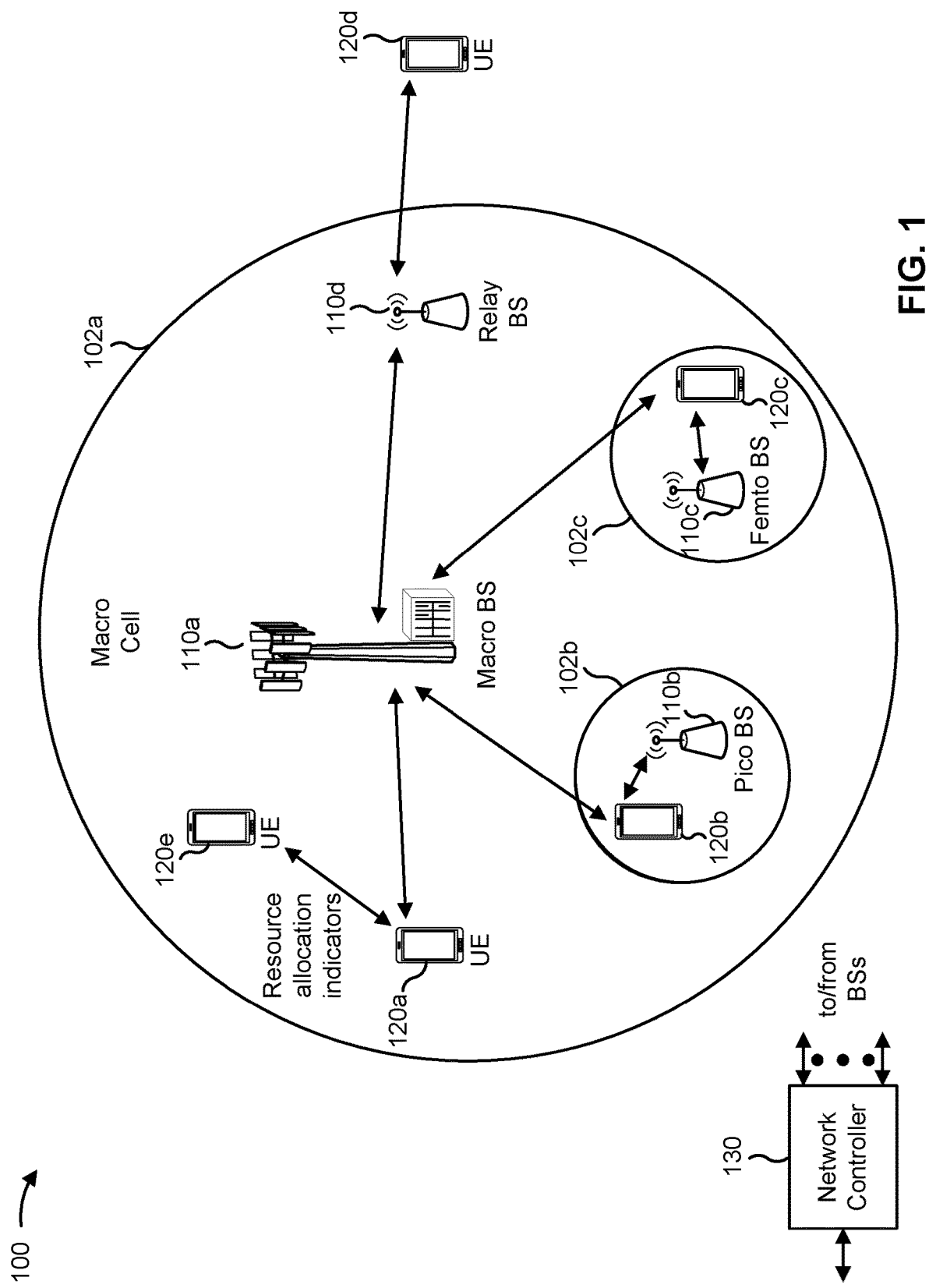
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D)

communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

In some aspects, the UE 120a may function as a relay UE between one or more source UEs (e.g., the UE 120e) and at least one destination (e.g., the base station 110 or another UE). The at least one destination may include a final destination for a transmission from the UE 120e or one or more UEs along a relay chain. Accordingly, a relay chain may include one or more hops, where each hop includes at least one UE between the one or more source UEs and the at least one destination. In example 100, the relay chain is a one-hop chain, and the hop includes the single UE 120a. Other examples may include multi-hop chains and/or hops with a plurality of UEs (e.g., as shown in FIGS. 5A, 5B, 7A, and 7B, described below).

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
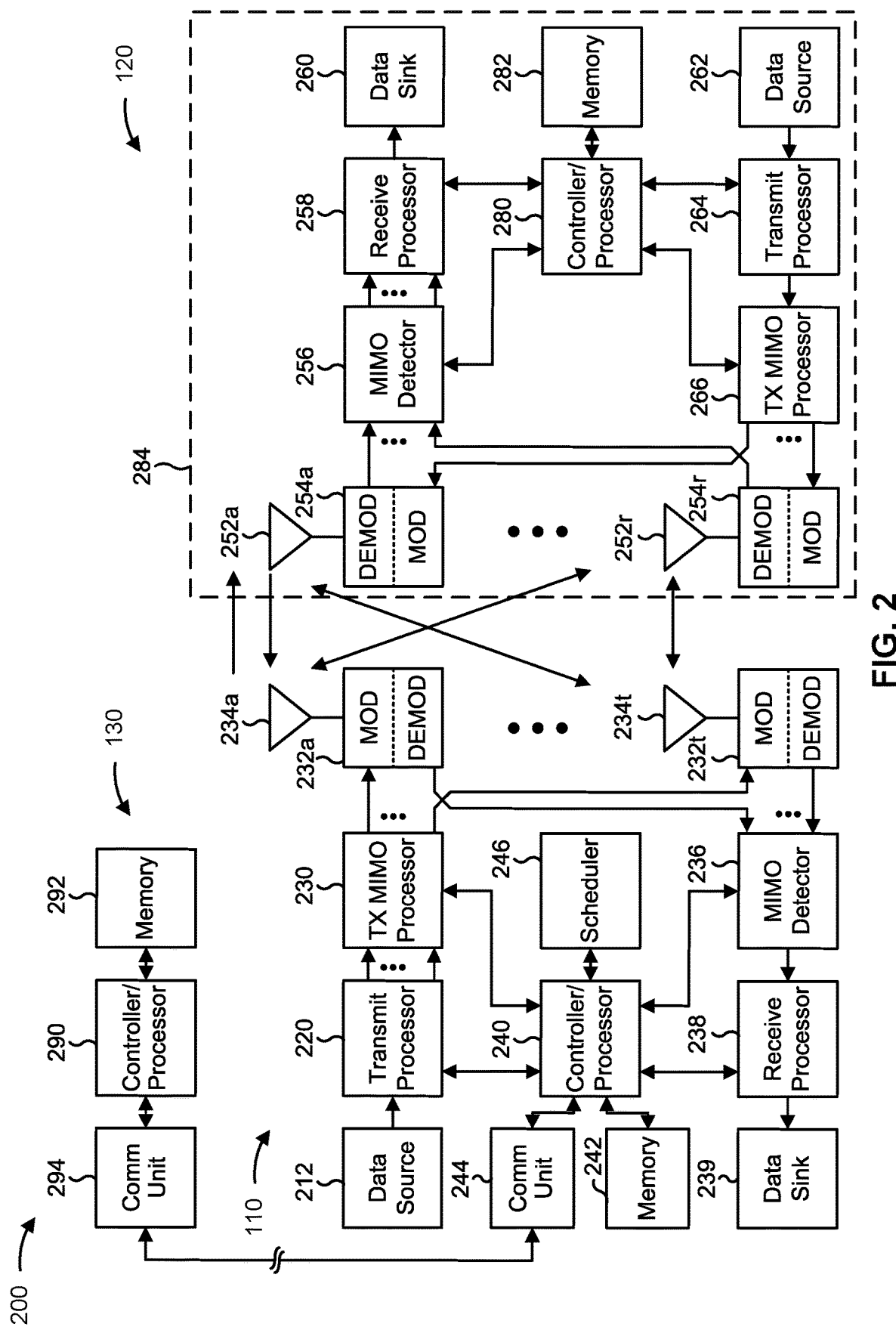
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 5A-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 5A-9).

Controller/processor 240 of base station 110, controller/processor 280 of UE 120, and/or any other component(s) of FIG. 2 may perform one or more techniques associated with allocating resources to source UEs from a UE in a hop, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include miming the instructions, converting the instructions, compiling the instructions, and/or interpreting the instructions, among other examples.

Figure 10:
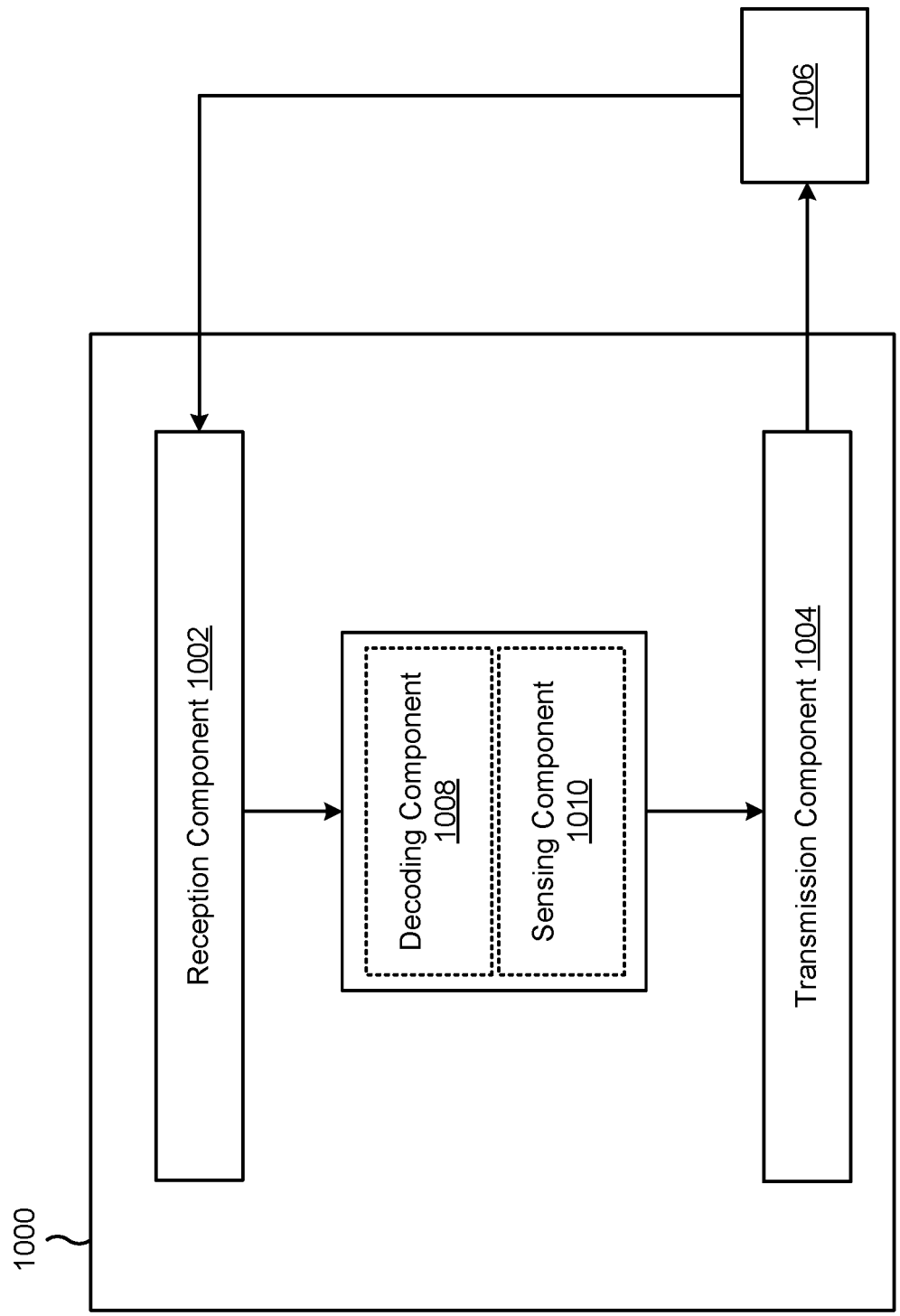
FIGS. 10 and 11 are block diagrams of example apparatuses for wireless communication, in accordance with the present disclosure.

In some aspects, a UE (e.g., a UE 120 and/or an apparatus 1000 of FIG. 10) may include means for transmitting, to a first source UE (e.g., another UE 120 and/or another apparatus 1000 of FIG. 10) of two or more source UEs, an indication of a first resource allocation for transmitting first data; means for transmitting, to a second source UE (e.g., another UE 120 and/or another apparatus 1000 of FIG. 10) of the two or more source UEs, an indication of a second resource allocation for transmitting second data; means for receiving, from the first source UE, the first data using the first resource allocation; means for receiving, from the second source UE, the second data using the second resource allocation; and/or means for transmitting the first data and the second data to at least one destination UE (e.g., another UE 120 and/or another apparatus 1000 of FIG. 10). The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a UE (e.g., a UE 120 and/or an apparatus 1000 of FIG. 10) may include means for transmitting, to a first relay UE (e.g., another UE 120 and/or another apparatus 1000 of FIG. 10), a first report based at least in part on a sidelink channel between the UE and the first relay UE; means for receiving, from the first relay UE, an indication of a first resource allocation based at least in part on the first report; and/or means for transmitting, to the first relay UE, first data using the first resource allocation. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
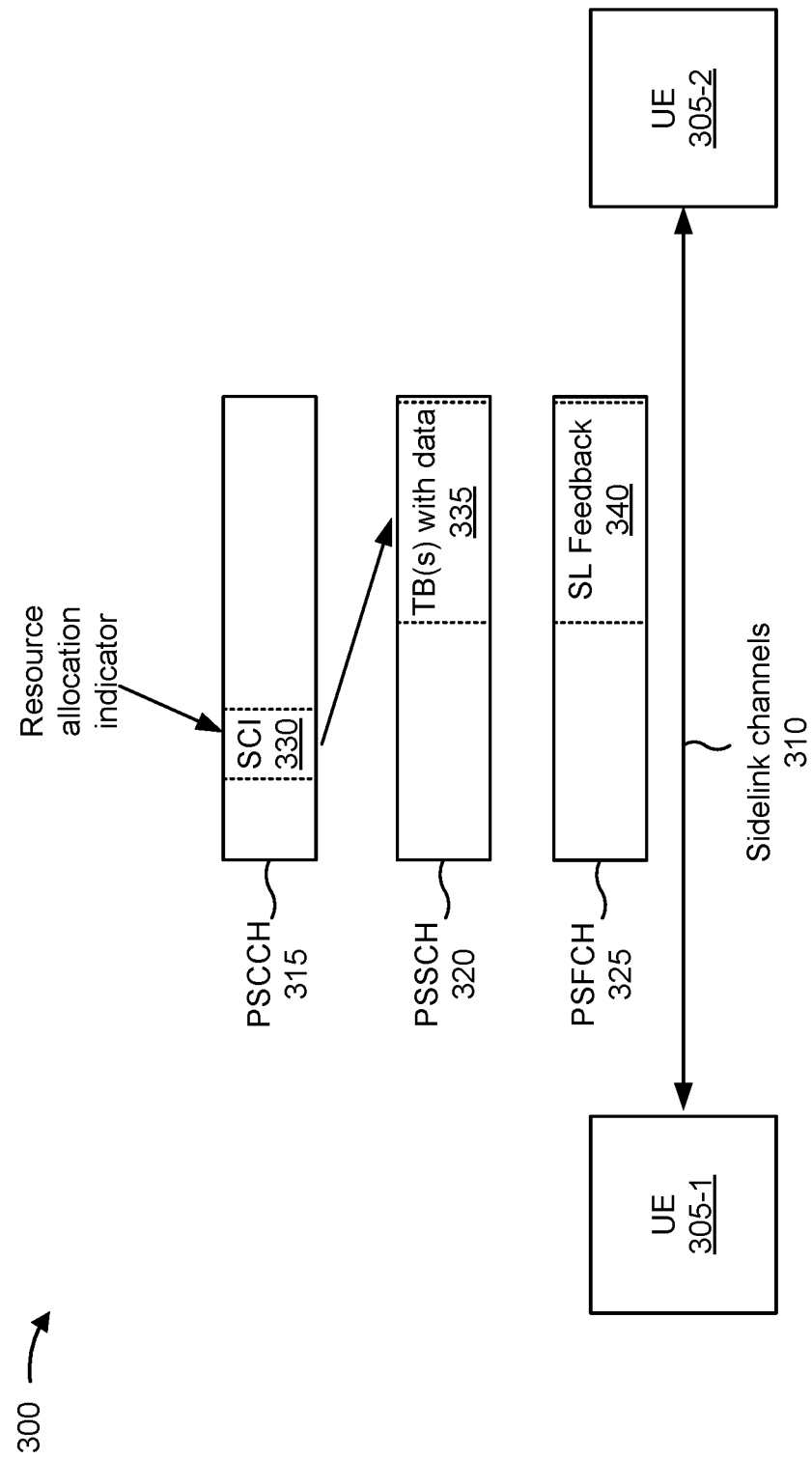
FIG. 3 is a diagram illustrating an example of sidelink communications, in accordance with the present disclosure.

FIG. 3 is a diagram illustrating an example 300 of sidelink communications, in accordance with the present disclosure. As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, and as further shown in FIG. 3, the SCI 330 may include an indication of a resource allocation for transmitting data on the sidelink channel(s) 310. For example, the UE 305-1 may be a relay UE to which a source UE (e.g., the UE 305-2) is transmitting data. Accordingly, the UE 305-1 may indicate a resource allocation for the UE 305-2 to use for transmitting data on the sidelink channel(s) 310 (e.g., as described below in connection with FIGS. 5A-7B). As an alternative, the relay UE 305-1 may include the indication of the resource allocation in another message on the PSCCH 315, the PSSCH 320, and/or the PSFCH 325.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
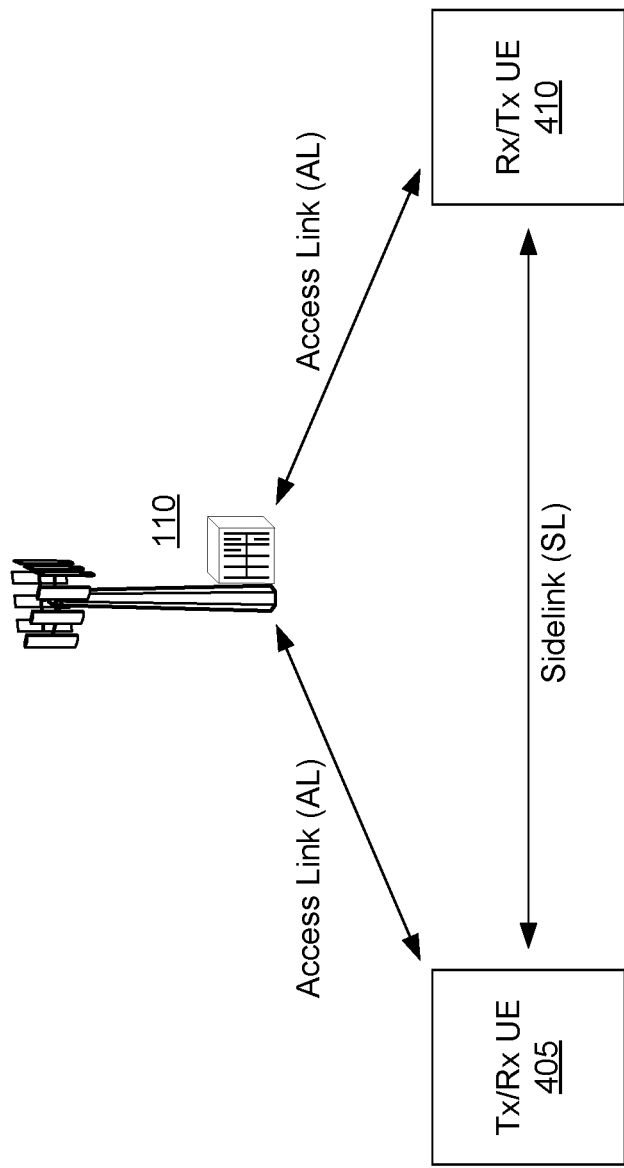
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure. As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

Sidelink channels allow some UEs to transmit data to other UEs and/or base stations that are too far away to receive the data directly (or at least far enough such that quality and/or reliability of direct transmissions is reduced). In some circumstances, a single UE may serve as a relay UE, on a hop, to a plurality of source UEs. When the source UEs transmit to the relay UE, the transmissions may collide, which reduces quality and/or reliability of communications on sidelink channels between the relay UE and the source UEs. Additionally, collisions may increase latency and waste processing resources, network overhead, and battery power by resulting in the source UEs having to retransmit the transmissions to the relay UE.

Figure 5A:
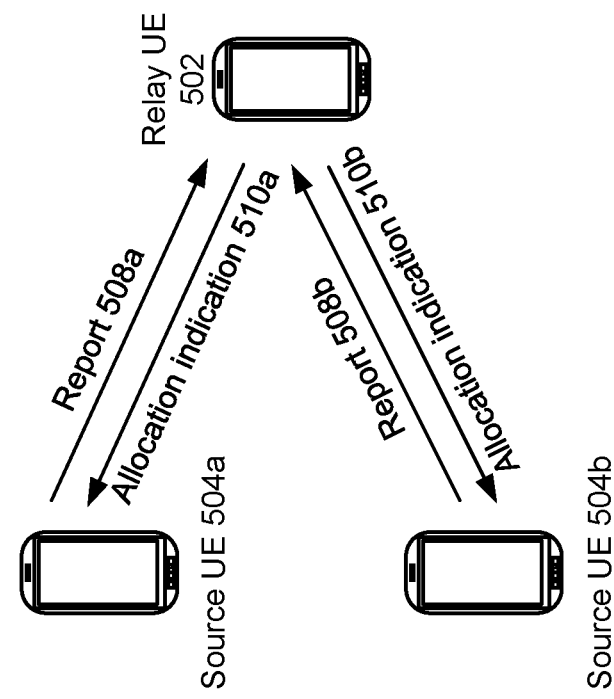
FIGS. 5A and 5B are diagrams illustrating an example associated with a relay UE allocating resources to source UEs, in accordance with the present disclosure.
Figure 5B:
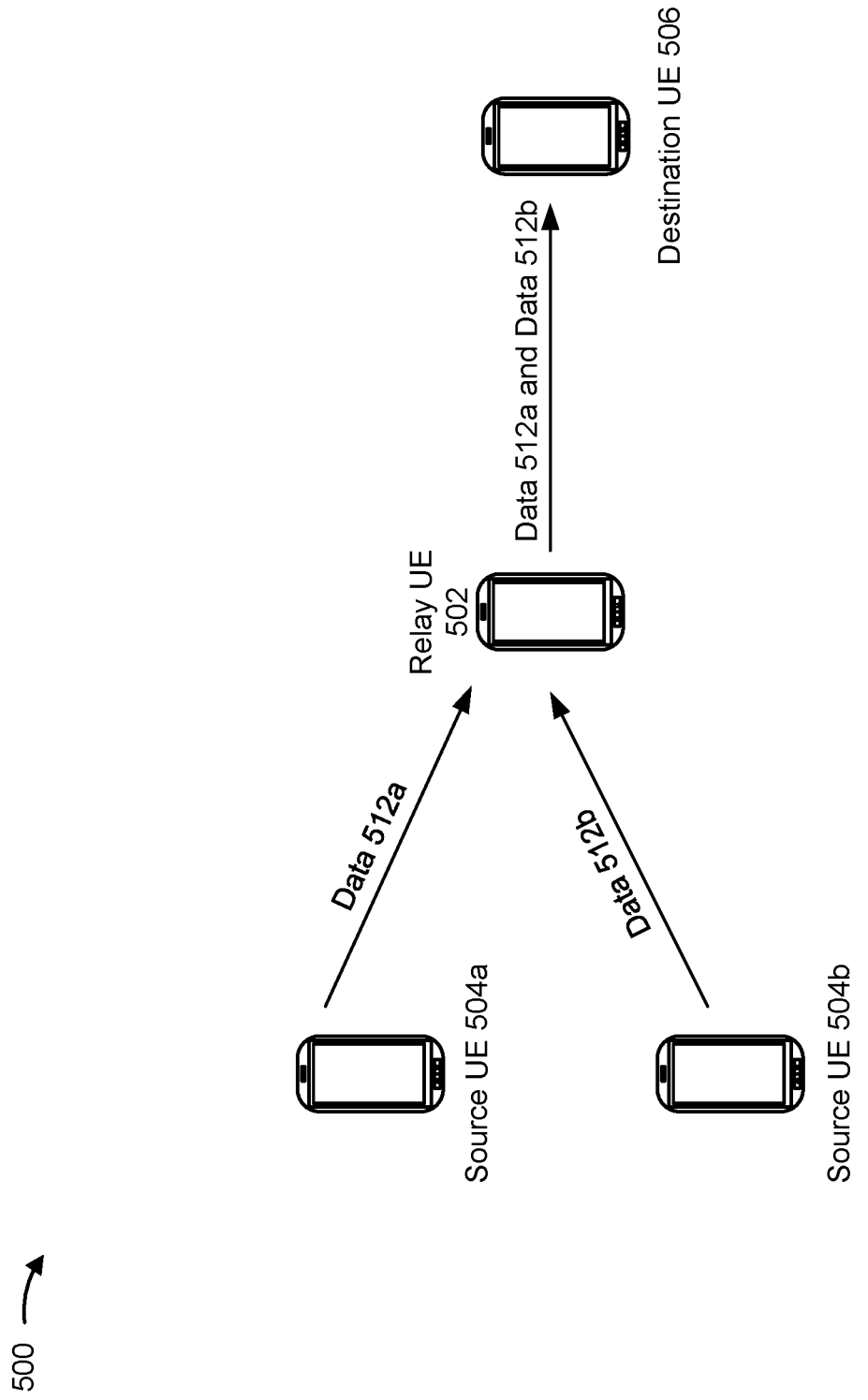
Figure 7A:
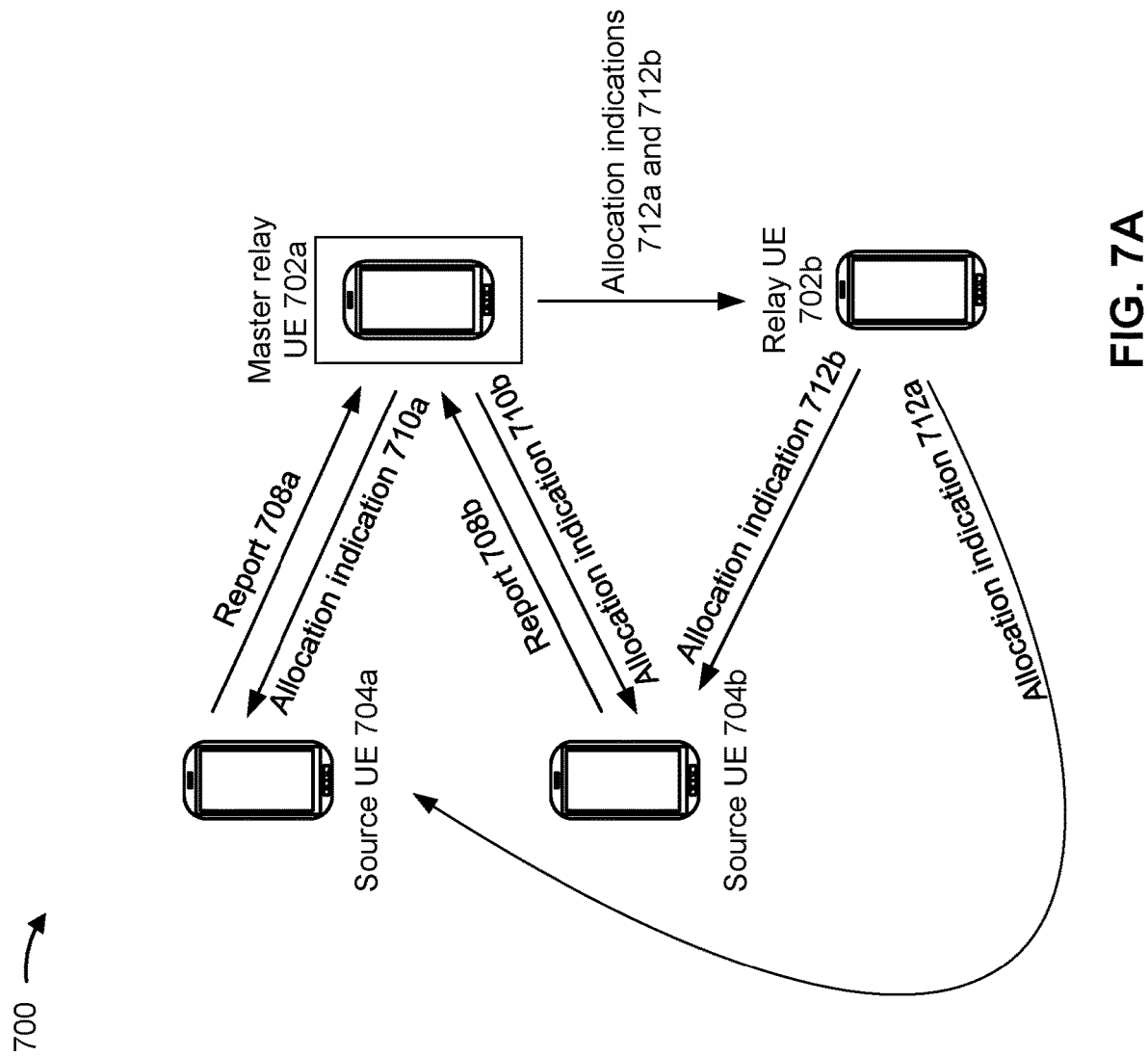

Some techniques and apparatuses described herein enable a relay UE (e.g., a UE 120, UE 502 depicted in FIGS. 5A-5B, and/or UE 702a or UE 702b depicted in FIGS. 7A-7B) to determine resource allocations for a plurality of source UEs (e.g., UEs 120, UEs 504a and 504b depicted in FIGS. 5A-5B, and/or UEs 704a and 704b depicted in FIGS. 7A-7B). As a result, the relay UE 502 may manage interference between first data received from a first source UE 504*a*, second data received from a second source UE 504*b*, and/or other data received from one or more other source UEs. Accordingly, the relay UE 502 increases quality and/or reliability of communications on sidelink channels between the relay UE 502 and the source UEs 504*a* and 504*b*. Additionally, the relay UE 502 decreases latency and conserves processing resources, network overhead, and battery power by reducing a chance that the source UE 504*a* will need to retransmit the first data and/or that the source UE 504*b* will need to retransmit the second data.

As indicated above, FIG. 4 is provided as an example. Other examples may differ from what is described with respect to FIG. 4.

FIGS. 5A and 5B are diagrams illustrating an example 500 associated with a relay UE (e.g., relay UE 502) allocating resources to source UEs (e.g., source UE 504*a* and source UE 504*b*), in accordance with the present disclosure. As shown in FIG. 5A, example 500 includes the relay UE 502 communicating with the first source UE 504*a* on a PC5 interface (e.g., on a sidelink channel as described above in connection with FIGS. 3-4) and the relay UE 502 communicating with the second source UE 504*b* on another PC5 interface (e.g., on another sidelink channel as described above in connection with FIGS. 3-4). For example, the source UEs 504*a* and 504*b* may use the relay UE 502 to transmit to a device that is far from the source UEs 504*a* and 504*b*. Although described below using two source UEs, the description similarly applies to additional source UEs (e.g., three source UEs communicating with the relay UE 502, four source UEs communicating with the relay UE 502, and so on).

As shown in FIG. 5B, example 500 further includes the relay UE 502 communicating with at least one destination UE (e.g., destination UE 506). The destination UE 506 may include a final destination for data from the first source UE 504*a* and/or the second source UE 504*b* or may include a UE on another hop en route to the final destination.

In some aspects, the first source UE 504*a* may estimate resource availability associated with an environment of the first source UE 504*a*. For example, the first source UE 504*a* may sense the environment to determine availabilities associated with a plurality of resources (e.g., one or more portions of a frequency domain, one or more portions of a time domain, one or more beams, and/or other physical properties associated with a sidelink channel between the relay UE 502 and the first source UE 504*a*). The determination may be based at least in part on a carrier sensing (CS)/energy detection (ED) procedure, a carrier sensing multiple access (CSMA) procedure, a clear channel assessment (CCA) procedure, a carrier sensing adaptive transmission (CSAT) procedure, and/or another procedure to determine the availabilities associated with the plurality of resources. The first source UE 504*a* may generate a first report 508*a* (e.g., a bitmap as described below in connection with FIG. 6, a channel state information (CSI) report, and/or another type of report) based at least in part on the resource availability. Accordingly, the first source UE 504*a* may transmit, and the relay UE 502 may receive, the first report 508*a*. For example, the first source UE 504*a* may transmit the first report 508*a* to the relay UE 502 over a PSCCH, a PSSCH, and/or a PSFCH (e.g., as described above in connection with FIGS. 3-4).

Similarly, the second source UE 504*b* may estimate resource availability associated with an environment of the second source UE 504*b*. For example, the second source UE 504*b* may similarly sense the environment of the second source UE 504*b* as described above with respect to the first source UE 504*a*. The second source UE 504*b* may generate a second report 508*b* (e.g., a bitmap as described below in connection with FIG. 6, a CSI report, and/or another type of report) based at least in part on the resource availability. Accordingly, the second source UE 504*b* may transmit, and the relay UE 502 may receive, the second report. For example, the second source UE 504*b* may similarly transmit the second report 508*b* as described above with respect to the first source UE 504*a* transmitting the first report.

Additionally, or alternatively, the relay UE 502 may estimate resource availability associated with an environment of the relay UE 502. For example, the relay UE 502 may sense the environment to determine availabilities associated with a plurality of resources (e.g., one or more portions of a frequency domain, one or more portions of a time domain, one or more beams, and/or other physical properties associated with a sidelink channel between the relay UE 502 and the destination UE 506). Additionally, or alternatively, the relay UE 502 may sense the environment to determine availabilities associated with a plurality of resources (e.g., one or more portions of a frequency domain, one or more portions of a time domain, one or more beams, and/or other physical properties associated with the sidelink channel between the relay UE 502 and the first source UE 504*a* and/or the sidelink channel between the relay UE 502 and the second source UE 504*b*). The determination(s) may be based at least in part on a CS/ED procedure, a CSMA procedure, a CCA procedure, a CSAT procedure, and/or another procedure to determine the availabilities associated with the plurality of resources. The relay UE 502 may generate one or more reports (e.g., a bitmap as described below in connection with FIG. 6, a CSI report, and/or another type of report) based at least in part on the resource availability.

As shown in FIG. 5A, the relay UE 502 may transmit, and the first source UE 504*a* may receive, an indication 510*a* of a first resource allocation for transmitting data (e.g., first data 512*a*). The indication 510*a* may include a bitmap as described below in connection with FIG. 6, one or more resource grants, and/or another type of indication. The first resource allocation may be based at least in part on the first report 508*a* and the second report 508*b* (e.g., as described below in connection with FIG. 6). Additionally, or alternatively, the first resource allocation may be based at least in part on the resource availability associated with the environment of the relay UE 502.

Similarly, the relay UE 502 may transmit, and the second source UE 504*b* may receive, an indication 510*b* of a second resource allocation for transmitting data (e.g., second data 512*b*). The indication 510*b* may include a bitmap as described below in connection with FIG. 6, one or more resource grants, and/or another type of indication. Similarly to the first resource allocation, the second resource allocation may be based at least in part on the first report 508*a* and the second report 508*b* (e.g., as described below in connection with FIG. 6). Additionally, or alternatively, the second resource allocation may be based at least in part on the resource availability associated with the environment of the relay UE 502.

Accordingly, as shown in FIG. 5B, the first source UE 504*a* may transmit, and the relay UE 502 may receive, the first data 512*a* using the first resource allocation. For example, the first source UE 504*a* may transmit the first data 512*a* to the relay UE 502 over a PSCCH, a PSSCH, and/or a PSFCH (e.g., as described above in connection with FIGS. 3-4). Similarly, the second source UE 504*b* may transmit, and the relay UE 502 may receive, the second data 512b using the second resource allocation. For example, the second source UE 504b may transmit the second data 512b to the relay UE 502 over a PSCCH, a PSSCH, and/or a PSFCH (e.g., as described above in connection with FIGS. 3-4).

Additionally, as further shown in FIG. 5B, the relay UE 502 may transmit, and the destination UE 506 may receive, the first data 512a and the second data 512b. For example, the relay UE 502 may transmit the first data 512a and the second data 512b to the destination UE 506 over a PSCCH, a PSSCH, and/or a PSFCH (e.g., as described above in connection with FIGS. 3-4).

In some aspects, the relay UE 502 may transmit, and the destination UE 506 may receive, an indication of the resource availability associated with the environment of the relay UE 502. For example, the indication may include a bitmap as described below in connection with FIG. 6, a CSI report, and/or another type of report associated with the sidelink channel between the relay UE 502 and the destination UE 506. Accordingly, the destination UE 506 may transmit, and the relay UE 502 may receive, an indication of a third resource allocation. For example, the indication may include a bitmap as described below in connection with FIG. 6, one or more resource grants, and/or another type of indication. The third resource allocation may be based at least in part on the indication of the resource availability associated with the environment of the relay UE 502. For example, the destination UE 506 may determine the third resource allocation similarly to how the relay UE 502 determined the first resource allocation and/or the second resource allocation (e.g., as described below in connection with FIG. 6).

Additionally, or alternatively, the destination UE 506 may sense the environment to determine availabilities associated with a plurality of resources (e.g., one or more portions of a frequency domain, one or more portions of a time domain, one or more beams, and/or other physical properties associated with the sidelink channel between the relay UE 502 and the destination UE 506). The determination(s) may be based at least in part on a CS/ED procedure, a CSMA procedure, a CCA procedure, a CSAT procedure, and/or another procedure to determine the availabilities associated with the plurality of resources. Accordingly, the third resource allocation may be based at least in part on the resource availability associated with the environment of the destination UE 506.

The relay UE 502 may use the third resource allocation, as described above, to transmit the first data 512a and the second data 512b to the destination UE 506. In some aspects, the destination UE 506 may assign one portion of the third resource allocation for the first data 512a and a different portion of the third resource allocation for the second data 512b. For example, in some aspects, the first data 512a may be transmitted using a different transmit power than the second data 512b. Accordingly, the destination UE 506 may distinguish transmission of the first data 512a from transmission of the second data 512b.

In some aspects, the destination UE 506 may use a quality of service (QoS), a priority, a TB size, a reliability (e.g., a minimum reliability and/or another reliability requirement), and/or another property of the first data 512a to determine the portion of the third resource allocation for the first data 512a (e.g., similar to the process described below in connection with FIG. 6). Similarly, the destination UE 506 may use a QoS, a priority, a TB size, a reliability, and/or another property of the second data 512b to determine the portion of the third resource allocation for the second data 512b. For example, the destination UE 506 may assign a higher transmit power to use for the first data 512a, as compared with a transmit power to use for the second data 512b, based at least in part on a higher QoS, a higher priority, a larger TB size, a higher reliability, and/or another property of the first data 512a, as compared with a corresponding property of the second data 512b.

By using techniques as described in connection with FIGS. 5A-5B, the relay UE 502 may manage interference between the first data 512a received from the first source UE 504a and the second data 512b received from the second source UE 504b. Accordingly, the relay UE 502 increases quality and/or reliability of communications on sidelink channels between the relay UE 502 and the source UEs 504a and 504b. Additionally, the relay UE 502 decreases latency and conserves processing resources, network overhead, and battery power by reducing a chance that the first source UE 504a will need to retransmit the first data 512a and/or that the second source UE 504b will need to retransmit the second data 512b.

As indicated above, FIGS. 5A and 5B are provided as an example. Other examples may differ from what is described with respect to FIGS. 5A and 5B.

Figure 6:
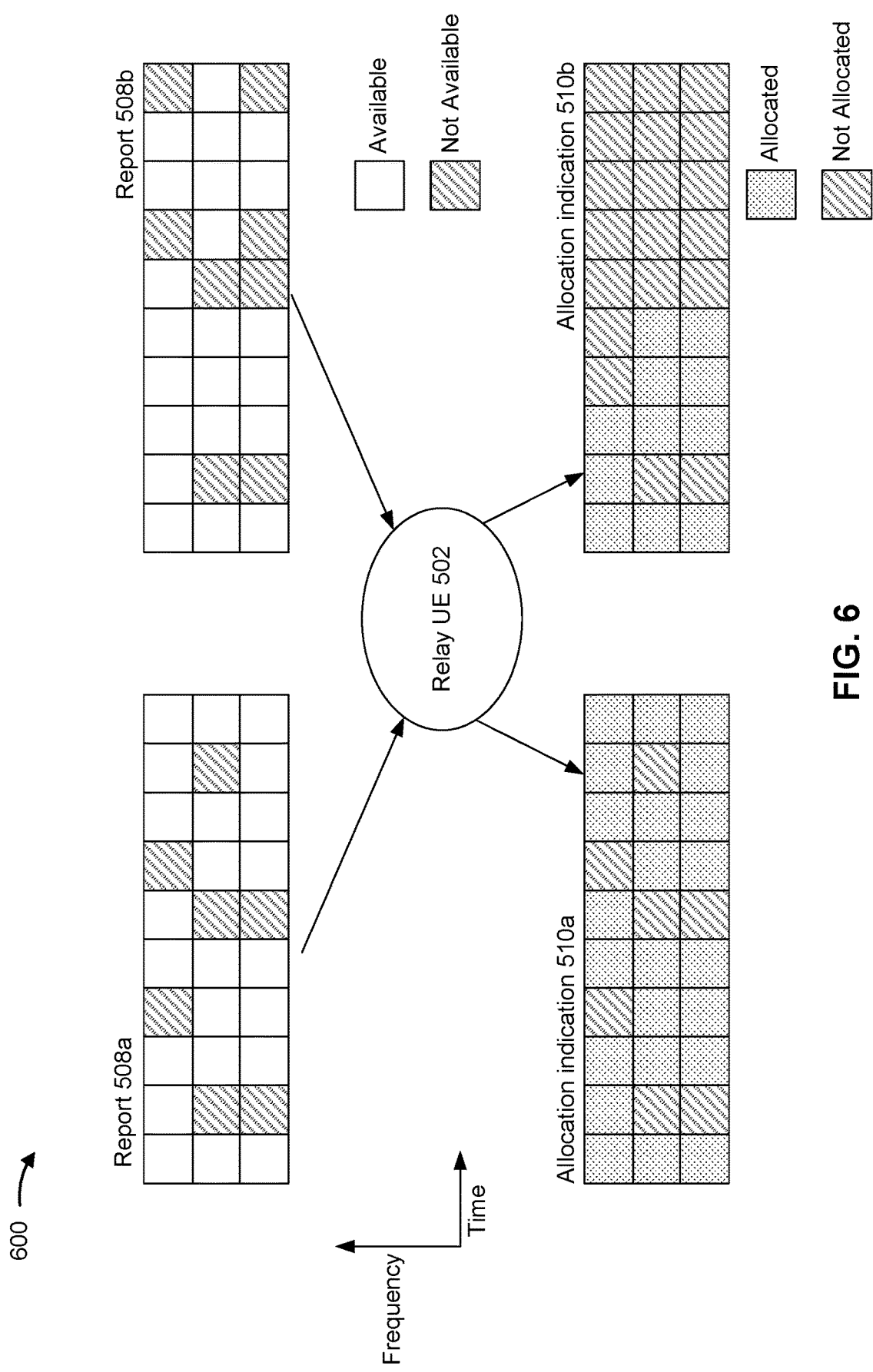
FIG. 6 is a diagram illustrating an example associated with resource reports generated by source UEs and resource allocations configured by a relay UE, in accordance with the present disclosure.

FIG. 6 is a diagram illustrating an example 600 associated with resource reports generated by source UEs and resource allocations configured by a relay UE (e.g., relay UE 502), in accordance with the present disclosure. Example 600 includes the relay UE 502 communicating with a first source UE (e.g., first source UE 504a of FIG. 5) on a PC5 interface (e.g., on a sidelink channel as described above in connection with FIGS. 3-4) and a second source UE (e.g., second source UE 504b of FIG. 5) on another PC5 interface (e.g., on another sidelink channel as described above in connection with FIGS. 3-4). For example, the source may use the relay UE 502 to transmit to a device that is far from the source UEs (e.g., destination UE 506 of FIG. 5). Although described below using two source UEs, the description similarly applies to additional source UEs (e.g., three source UEs communicating with the relay UE 502, four source UEs communicating with the relay UE 502, and so on).

As shown in FIG. 6, the relay UE 502 may receive (e.g., from the first source UE 504a) a first report 508a. In some aspects, the relay UE 502 may receive the first report 508a over a PSCCH, a PSSCH, and/or a PSFCH (e.g., as described above in connection with FIGS. 3-4). In example 600, the first report 508a includes a bitmap. For example, the bitmap may indicate whether one or more resources along a time domain are available and whether one or more resources along a frequency domain are available. Although described with respect to frequency and time, the bitmap may use fewer dimensions (e.g., when only a single frequency resource is used between the first source UE 504a and the relay UE 502, or when only a single time resource, such as a single symbol, slot, subframe, or frame, is used between the first source UE 504a and the relay UE 502). As an alternative, the bitmap may use additional dimensions (e.g., a spatial domain indicating whether one or more beams are available and/or another domain). In some aspects, the first report 508a may additionally or alternatively include a CSI report and/or another type of report.

Similarly, the relay UE 502 may receive (e.g., from the second source UE 504b) a second report 508b. In some aspects, the relay UE 502 may receive the second report 508b over a PSCCH, a PSSCH, and/or a PSFCH (e.g., as described above in connection with FIGS. 3-4). In example 600, the second report 508b includes a bitmap. For example, the bitmap may indicate whether one or more resources along a time domain are available and whether one or more resources along a frequency domain are available. Although described with respect to frequency and time, the bitmap may use fewer dimensions (e.g., when only a single frequency resource is used between the second source UE 504b and the relay UE 502 or when only a single time resource, such as a single symbol, slot, subframe, or frame, is used between the second source UE 504b and the relay UE 502). As an alternative, the bitmap may use additional dimensions (e.g., a spatial domain indicating whether one or more beams are available and/or another domain). In some aspects, the second report 508b may additionally or alternatively include a CSI report and/or another type of report.

Based at least in part on the first report 508a and the second report 508b, the relay UE 502 may determine an indication 510a of a first resource allocation (e.g., for use by the first source UE 504a). For example, the relay UE 502 may allocate one or more resources indicated as available in the first report 508a. In example 600, the relay UE 502 has allocated all resources that are indicated as available in the first report 508a, but in other examples the relay UE 502 may allocate fewer resources than are indicated as available in the first report 508a.

Additionally, or alternatively, the relay UE 502 may allocate resources orthogonal to one or more resources indicated as available in the second report 508b. For example, the first resource allocation may include one or more resources that do not overlap with one or more resources included in the second resource allocation. In some aspects, the first resource allocation may include one or more different frequencies, one or more different time resources, and/or one or more different beams than included in the second resource allocation. Accordingly, the relay UE 502 may distinguish data transmitted by the first source UE 504a (e.g., first data 512a of FIG. 5) from data transmitted by the second source UE 504b (e.g., second data 512b of FIG. 5) based at least in part on which resource(s) was used to receive. Additionally, or alternatively, and as shown in FIG. 6, the relay UE 502 may allocate resources that overlap with one or more resources indicated as available in the second report 508b. For example, the first resource allocation may include one or more resources that overlap with one or more resources included in the second resource allocation. Accordingly, the relay UE 502 may decode the first data 512a and the second data 512b using one or more interference cancellation techniques. For example, the relay UE 502 may use successful interference cancellation for non-orthogonal multiple access (NOMA), channel inversion, dirty paper coding, block diagonalization, Tomlinson-Harashima precoding, and/or another interference cancellation technique. Accordingly, the relay UE 502 may allocate resources that overlap based at least in part on a capability of the relay UE 502 to perform interference cancellation.

Similarly, based at least in part on the first report 508a and the second report 508b, the relay UE 502 may determine an indication 510b of a second resource allocation (e.g., for use by the second source UE 504b). For example, the relay UE 502 may allocate one or more resources indicated as available in the second report 508b. In example 600, the relay UE 502 has allocated fewer resources than are indicated as available in the second report 508b, but in other examples the relay UE 502 may allocate all resources that are indicated as available in the second report 508b. Additionally, or alternatively, the relay UE 502 may allocate resources orthogonal to one or more resources indicated as available in the first report 508a and/or resources that overlap with one or more resources indicated as available in the first report 508a, as described above.

In any of the aspects described above, the first resource allocation may include a different MCS, a different transmit power, and/or a different redundancy version (RV), than included in the second resource allocation. Accordingly, the relay UE 502 may distinguish the first data 512a transmitted by the first source UE 504a from the second data 512b transmitted by the second source UE 504b based at least in part on the different MCS, transport power, and/or RV. The relay UE 502 may use the different MCS, transport power, and/or RV in combination with non-overlapping resources (included in the first resource allocation and the second resource allocation, as described above) to distinguish the first data 512a from the second data 512b. As an alternative, the relay UE 502 may use the different MCS, transport power, and/or RV to perform one or more interference cancellation techniques, as described above, to distinguish the first data 512a from the second data 512b.

In some aspects, the relay UE 502 may determine the first resource allocation based, at least in part, on a priority associated with the first data 512a, a QoS associated with the first data 512a, a TB size associated with the first data 512a, and/or a reliability (e.g., a minimum reliability and/or other reliability requirement) associated with the first data 512a. Similarly, the relay UE 502 may determine the second resource allocation based, at least in part, on a priority associated with the second data 512b, a QoS associated with the second data 512b, a TB size associated with the second data 512b, and/or a reliability associated with the second data 512b.

For example, as shown in FIG. 6, the relay UE 502 may allocate more resources to the first source UE 504a than to the second source UE 504b based at least in part on the priority associated with the first data 512a, the QoS associated with the first data 512a, the TB size associated with the first data 512a, and/or the reliability associated with the first data 512a being higher than the priority associated with the second data 512b, the QoS associated with the second data 512b, the TB size associated with the second data 512b, and/or the reliability associated with the second data 512b, respectively. The quantity of additional resources allocated to the first source UE 504a as compared with the second source UE 504b may be based at least in part on one or more differences between the priority associated with the first data 512a, the QoS associated with the first data 512a, the TB size associated with the first data 512a, and/or the reliability associated with the first data 512a, and the priority associated with the second data 512b, the QoS associated with the second data 512b, the TB size associated with the second data 512b, and/or the reliability associated with the second data 512b, respectively. Additionally, or alternatively, the quantity of additional resources allocated to the first source UE 504a as compared with the second source UE 504b may be based at least in part on a minimum quantity of resources allocated to the second source UE 504b (e.g., based at least in part on the priority associated with the second data 512b, the QoS associated with the second data 512b, the TB size associated with the second data 512b, and/or the reliability associated with the second data 512b) and/or a capability of the relay UE 502 (e.g., when the relay UE 502 is not configured to perform interference cancellation such that the relay UE 502 allocates a minimum quantity of resources to the second source UE 504b, but with the first resource allocation and the second resource allocation remaining orthogonal).

Additionally, or alternatively, as shown in FIG. 6, the relay UE 502 may allocate more non-overlapping (e.g., orthogonal) resources to the first source UE 504a than to the second source UE 504b based at least in part on the priority associated with the first data 512a, the QoS associated with the first data 512a, the TB size associated with the first data 512a, and/or the reliability associated with the first data 512a being higher than the priority associated with the second data 512b, the QoS associated with the second data 512b, the TB size associated with the second data 512b, and/or the reliability associated with the second data 512b, respectively. The quantity of additional orthogonal resources allocated to the first source UE 504a as compared with the second source UE 504b may be based at least in part on one or more differences between the priority associated with the first data 512a, the QoS associated with the first data 512a, the TB size associated with the first data 512a, and/or the reliability associated with the first data 512a, and the priority associated with the second data 512b, the QoS associated with the second data 512b, the TB size associated with the second data 512b, and/or the reliability associated with the second data 512b, respectively.

In some aspects, based at least in part on the priority associated with the first data 512a, the QoS associated with the first data 512a, the TB size associated with the first data 512a, and/or the reliability associated with the first data 512a being higher than the priority associated with the second data 512b, the QoS associated with the second data 512b, the TB size associated with the second data 512b, and/or the reliability associated with the second data 512b, respectively, the relay UE 502 may determine to block the second source UE 504b from transmitting until a later time (e.g., after the relay UE 502 receives the first data 512a). For example, the priority associated with the first data 512a, the QoS associated with the first data 512a, the TB size associated with the first data 512a, and/or the reliability associated with the first data 512a may be higher by one or more thresholds than the priority associated with the second data 512b, the QoS associated with the second data 512b, the TB size associated with the second data 512b, and/or the reliability associated with the second data 512b, respectively. Accordingly, the relay UE 502 may transmit, and the second source UE 504b may receive, an indication that no resources are available. For example, the indication may include a bitmap with all resources indicated as not available, an indicator that the second source UE 504b has not received a grant to transmit, and/or another type of indication. Thereafter, the relay UE 502 may transmit, and the second source UE 504b may receive, the indication 510b. In some aspects, the second source UE 504b may transmit, and the relay UE 502 may receive, a new report such that the relay UE 502 determines a new second resource allocation for the second source UE 504b to use to transmit the second data 512b.

By using techniques as described in connection with FIG. 6, the relay UE 502 may manage interference between first data received from a first source UE and second data received from a second source UE. Accordingly, the relay UE 502 increases quality and/or reliability of communications on sidelink channels between the relay UE 502 and the source UEs. Additionally, the relay UE 502 decreases latency and conserves processing resources, network overhead, and battery power by reducing a chance that the first source UE will need to retransmit the first data and/or that the second source UE will need to retransmit the second data.

As indicated above, FIG. 6 is provided as an example. Other examples may differ from what is described with respect to FIG. 6.

FIGS. 7A and 7B are diagrams illustrating an example 700 associated with a master UE (e.g., master relay UE 702a) within a hop, in accordance with the present disclosure. As shown in FIG. 7A, example 700 includes the master relay UE 702a communicating with the first source UE 704a on a PC5 interface (e.g., on a sidelink channel as described above in connection with FIGS. 3-4) and the master relay UE 702a communicating with the second source UE 704b on another PC5 interface (e.g., on another sidelink channel as described above in connection with FIGS. 3-4). For example, the source UEs 704a and 704b may use the master relay UE 702a to transmit to a device that is far from the source UEs 704a and 704b. Similarly, example 700 includes an additional relay UE 702b communicating with the first source UE 704a on a PC5 interface (e.g., on a sidelink channel as described above in connection with FIGS. 3-4) and the additional relay UE 702b communicating with the second source UE 704b on another PC5 interface (e.g., on another sidelink channel as described above in connection with FIGS. 3-4). For example, the source UEs 704a and 704b may use the additional relay UE 702b to transmit to a device that is far from the source UEs 704a and 704b. Although described below using two source UEs, the description similarly applies to additional source UEs (e.g., three source UEs communicating with the master relay UE 702a and/or the additional relay UE 702b, four source UEs communicating with the master relay UE 702a and/or the additional relay UE 702b, and so on).

As shown in FIG. 7B, example 700 further includes the master relay UE 702a and the additional relay UE 702b communicating with at least one destination UE (e.g., destination UE 706). The destination UE 706 may include a final destination for data from the first source UE 704a and/or the second source UE 704b or may include a UE on another hop en route to the final destination.

In some aspects, the first source UE 704a may estimate resource availability associated with an environment of the first source UE 704a. For example, the first source UE 704a may similarly sense the environment of the first source UE 704a as described above with respect to the first source UE 504a in connection with FIG. 5A. Similarly, the second source UE 704b may estimate resource availability associated with an environment of the second source UE 704b. For example, the second source UE 704b may similarly sense the environment of the second source UE 704b as described above with respect to the second source UE 504b in connection with FIG. 5A.

Accordingly, the master relay UE 702a may determine a first resource allocation for the first source UE 704a to use and a second resource allocation for the second source UE 704b to use. For example, the master relay UE 702a may determine the first resource allocation and the second resource allocation as described above in connection with FIG. 5A and/or FIG. 6. Accordingly, as shown in FIG. 5A, the master relay UE 702a may transmit, and the first source UE 704a may receive, an indication 710a of the first resource allocation for transmitting data (e.g., first data 714a). For example, the master relay UE 702a may similarly transmit the indication 710a as described above with respect to the indication 510a in connection with FIG. 5A. Similarly, the master relay UE 702a may transmit, and the second source UE 704b may receive, an indication 710b of the second resource allocation for transmitting data (e.g., second data 714b). For example, the master relay UE 702a may similarly transmit the indication 710b as described above with respect to the indication 510b in connection with FIG. 5A.

As shown in FIG. 7A, the master relay UE 702a may additionally transmit, and the additional relay UE 702b may receive, an indication of at least one additional resource allocation for the first source UE 704a and/or the second source UE 704b, to use to communicate with the additional relay UE 702b. For example, the master relay UE 702a may determine the at least one additional resource allocation as described above in connection with FIG. 5A and/or FIG. 6. In example 700, the master relay UE 702a transmits an indication 712a of a resource allocation for the first source UE 704a and an indication 712b of a resource allocation for the second source UE 704b. The indications 710a and 710b may each include a bitmap as described above in connection with FIG. 6, one or more resource grants, and/or another type of indication. The at least one additional resource allocation may be based at least in part on the first report 708a and the second report 708b (e.g., as described above in connection with FIG. 6). Additionally, or alternatively, the additional relay UE 702b may transmit, and the master relay UE 702a may receive, a report based at least in part on the additional relay UE 702b sensing the environment to determine availabilities associated with a plurality of resources (e.g., one or more portions of a frequency domain, one or more portions of a time domain, one or more beams, and/or other physical properties associated with sidelink channel(s) between the additional relay UE 702b and the source UEs 704a and 704b). The determination(s) may be based at least in part on a CS/ED procedure, a CSMA procedure, a CCA procedure, a CSAT procedure, and/or another procedure to determine the availabilities associated with the plurality of resources. Accordingly, the at least one additional resource allocation may be based at least in part on the report from the additional relay UE 702b. Additionally, or alternatively, the master relay UE 702a may sense the environment to determine availabilities associated with a plurality of resources (e.g., one or more portions of a frequency domain, one or more portions of a time domain, one or more beams, and/or other physical properties associated with sidelink channel(s) between the master relay UE 702a and the source UEs 704a and 704b). The determination(s) may be based at least in part on a CS/ED procedure, a CSMA procedure, a CCA procedure, a CSAT procedure, and/or another procedure to determine the availabilities associated with the plurality of resources. Accordingly, the at least one additional resource allocation may be based at least in part on the resource availability associated with the environment of the master relay UE 702a.

The additional relay UE 702b may transmit, and the first source UE 704a may receive, the indication 712a. For example, the additional relay UE 702b may similarly transmit the indication 712a as described above with respect to the indication 510a in connection with FIG. 5A. Similarly, the additional relay UE 702b may transmit, and the second source UE 704b may receive, the indication 712b. For example, the additional relay UE 702b may similarly transmit the indication 712b as described above with respect to the indication 510b in connection with FIG. 5A. As an alternative, the master relay UE 702a may transmit the indication 712a and the indication 712b to the first source UE 704a and the second source UE 704b, respectively.

Although described using a single additional relay UE, the description similarly applies to two or more additional relay UEs on the same hop. Additionally, or alternatively, in some aspects, the additional relay UE 702b may communicate with more source UEs (e.g., a third source UE, a fourth source UE, and so on) than the master relay UE 702a or fewer source UEs (e.g., only the first source UE 704a or only the second source UE 704b).

Accordingly, as shown in FIG. 7B, the first source UE 704a may transmit, and the master relay UE 702a may receive, the first data 714a using the first resource allocation. Additionally, the first source UE 704a may transmit, and the additional relay UE 702b may receive, the first data 714a using a corresponding portion of the at least one additional resource allocation. The first source UE 704a may similarly transmit the first data 714a as described above with respect to the first data 512a in connection with FIG. 5B. Similarly, the second source UE 704b may transmit, and the master relay UE 702a may receive, the second data 714b using the second resource allocation. Additionally, the second source UE 704b may transmit, and the additional relay UE 702b may receive, the second data 714b using a corresponding portion of the at least one additional resource allocation. The second source UE 704b may similarly transmit the second data 714b as described above with respect to the second data 512b in connection with FIG. 5B.

Additionally, as further shown in FIG. 7B, the master relay UE 702a may transmit, and the destination UE 706 may receive, the first data 714a and the second data 714b. The master relay UE 702a may similarly transmit the first data 714a and the second data 714b as described above with respect to the first data 512a and the second data 512b in connection with FIG. 5B. Similarly, the additional relay UE 702b may transmit, and the destination UE 706 may receive, the first data 714a and the second data 714b. The additional relay UE 702b may similarly transmit the first data 714a and the second data 714b as described above with respect to the first data 512a and the second data 512b in connection with FIG. 5B.

In some aspects, the master relay UE 702a may transmit, and the destination UE 706 may receive, an indication of the resource availability associated with the environment of the master relay UE 702a. Accordingly, the destination UE 506 may allocate resources, for the master relay UE 702a to transmit the first data 714a and the second data 714b, based at least in part on the indication (e.g., similarly described above with respect to the first data 512a and the second data 512b in connection with FIG. 5B). Additionally, or alternatively, the destination UE 706 may sense the environment to determine availabilities associated with a plurality of resources (e.g., one or more portions of a frequency domain, one or more portions of a time domain, one or more beams, and/or other physical properties associated with a sidelink channel between the master relay UE 702a and the destination UE 706). Accordingly, the destination UE 706 may allocate the resources based at least in part on the resource availability associated with the environment of the destination UE 706.

Similarly, the additional relay UE 702b may transmit, and the destination UE 706 may receive, an indication of the resource availability associated with the environment of the additional relay UE 702b. Accordingly, the destination UE 506 may allocate resources, for the additional relay UE 702b to transmit the first data 714a and the second data 714b, based at least in part on the indication (e.g., similarly described above with respect to the first data 512a and the second data 512b in connection with FIG. 5B). Additionally, or alternatively, the destination UE 706 may sense the environment to determine availabilities associated with a plurality of resources (e.g., one or more portions of a frequency domain, one or more portions of a time domain, one or more beams, and/or other physical properties associated with a sidelink channel between the additional relay UE 702b and the destination UE 706). Accordingly, the destination UE 706 may allocate the resources based at least in part on the resource availability associated with the environment of the destination UE 706.

In some aspects, and as described above in connection with FIG. 5B, the destination UE 706 may assign one portion of a resource allocation (e.g., indicated to the master relay UE 702a and/or the additional relay UE 702b) for the first data 714a and a different portion of the resource allocation for the second data 714b. In some aspects, the destination UE 706 may use a QoS, a priority, a TB size, a reliability (e.g., a minimum reliability and/or another reliability requirement), and/or another property of the first data 714a to determine the portion of the resource allocation for the first data 714a (e.g., similar to the process described above in connection with FIG. 6). Similarly, the destination UE 706 may use a QoS, a priority, a TB size, a reliability, and/or another property of the second data 714b to determine the portion of the resource allocation for the second data 714b.

In some aspects, the relay UE 702a and/or the additional relay UE 702b may determine that the relay UE 702a will serve as the master node. For example, the relay UE 702a may indicate, to the additional relay UE 702b, a proximity between the relay UE 702a and at least the first source UE 704a and the second source UE 704b. For example, the relay UE 702a may transmit one or more reference signals to at least the first source UE 704a and the second source UE 704b and, based at least in part on measurements of the reference signal(s) (e.g., transmitted to the relay UE 702a by the first source UE 704a and the second source UE 704b), estimate one or more distances between the relay UE 702a and at least the first source UE 704a and the second source UE 704b. Additionally, or alternatively, the additional relay UE 702b may indicate, to the relay UE 702a, a proximity between the additional relay UE 702b and at least the first source UE 704a and the second source UE 704b. For example, the additional relay UE 702b may estimate one or more distances between the additional relay UE 702b and at least the first source UE 704a and the second source UE 704b, as described above with respect to the relay UE 702a. Accordingly, the relay UE 702a and/or the additional relay UE 702b may determine that the relay UE 702a should serve as master node based at least in part on the one or more proximities (e.g., the proximity associated with the relay UE 702a being smaller than the proximity associated with the additional relay UE 702b). For example, the relay UE 702a may transmit, and the additional relay UE 702b may receive, an indication that the relay UE 702a is a master node for the hop. Additionally, or alternatively, the additional relay UE 702b may transmit, and the relay UE 702a may receive, a request that the relay UE 702a be the master node for the hop.

As an alternative, a controller (e.g., another UE in a different hop, such as the destination UE 706; a base station, such as base station 110; an external controller, such as a mobile termination (MT) unit of an integrated access and backhaul (IAB) network; and/or another device) may transmit, and the relay UE 702a may receive, an indication that the relay UE 702a is a master node for the hop. Accordingly, the controller may also transmit, and the additional relay UE 702b may receive, an indication that the relay UE 702a is the master node for the hop.

The relay UE 702a may serve as the master node until the relay UE 702a and/or the additional relay UE 702b determine that a different UE (e.g., the additional relay UE 702b) will serve as the master relay. For example, the relay UE 702a and/or the additional relay UE 702b may use a similar determination as described above (e.g., by determining that an updated proximity associated with the relay UE 702a is larger than an updated proximity associated with the additional relay UE 702b) such that the additional relay UE 702b serves as the master node for the hop. As an alternative, the controller may transmit, and the relay UE 702a may receive, an indication that the relay UE 702a is no longer the master node for the hop. Accordingly, the controller may also transmit, and the additional relay UE 702b may receive, an indication that the relay UE 702a is no longer the master node for the hop. For example, the controller may indicate that the additional relay UE 702b is the master node for the hop.

Additionally, or alternatively, the relay UE 702a may serve as the master node until the relay UE 702a indicates that the relay UE 702a can no longer serve as the master node (e.g., due to low battery power, high processor temperature, mobility of the relay UE 702a, and/or other environmental conditions). Accordingly, the relay UE 702a may transmit, and the additional relay UE 702b may receive, an indication that the relay UE 702a is no longer the master node for the hop. Accordingly, the additional relay UE 702b may serve as the master node for the hop thereafter.

By using techniques as described in connection with FIGS. 7A-7B, the master relay UE 702a may manage interference between the first data 714a received from the first source UE 704a and the second data 714b received from the second source UE 704b. Accordingly, the master relay UE 702a increases quality and/or reliability of communications on sidelink channels between the master relay UE 702a and the source UEs 704a and 704b. Additionally, the master relay UE 702a decreases latency and conserves processing resources, network overhead, and battery power by reducing a chance that the first source UE 704a will need to retransmit the first data 714a and/or that the second source UE 704b will need to retransmit the second data 714b. The master relay UE 702a further manages interference between the first data 714a transmitted from the first source UE 704a to the additional relay UE 702b and the second data 714b transmitted from the second source UE 704b to the additional relay UE 702b. Accordingly, the master relay UE 702a also increases quality and/or reliability of communications on sidelink channels between the additional relay UE 702b and the source UEs 704a and 704b, as well as decreasing latency and conserving processing resources, network overhead, and battery power for the additional relay UE 702b and the source UEs 704a and 704b.

As indicated above, FIGS. 7A and 7B are provided as an example. Other examples may differ from what is described with respect to FIGS. 7A and 7B.

Figure 8:
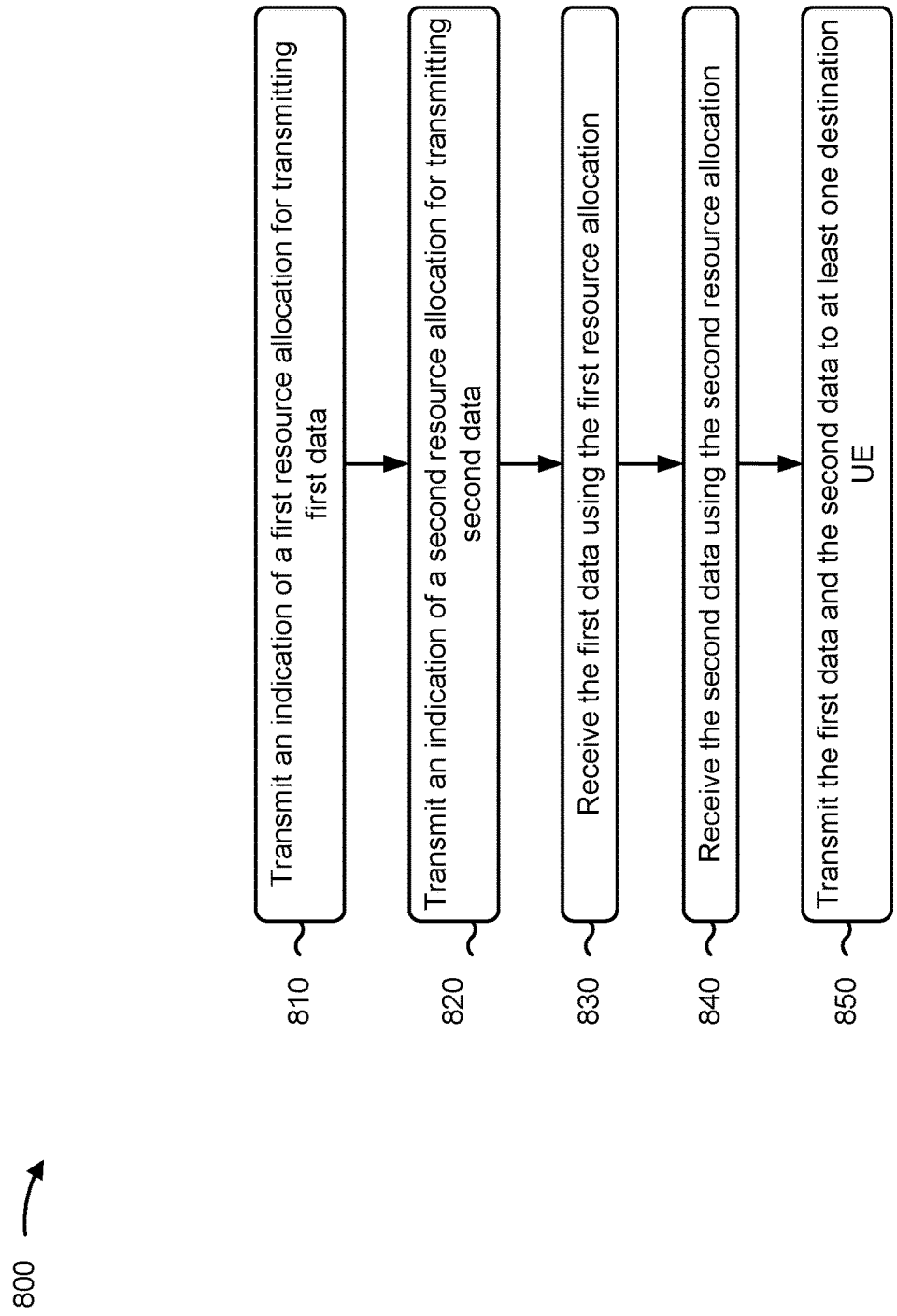
FIGS. 8 and 9 are diagrams illustrating example processes associated with allocating resources to source UEs from a relay UE in a hop, in accordance with the present disclosure.

FIG. 8 is a diagram illustrating an example process 800 performed, for example, by a UE, in accordance with the present disclosure. Example process 800 is an example where the UE (e.g., a UE 120, relay UE 502 of FIG. 5, relay UE 702a or relay UE 702b of FIG. 7, and/or an apparatus 1000 of FIG. 10) performs operations associated with transmitting resource allocations to source UEs.

As shown in FIG. 8, in some aspects, process 800 may include transmitting, to a first source UE (e.g., another UE 120, source UE 504a or source UE 504b of FIG. 5, source UE 704a or source UE 704b of FIG. 7, and/or another apparatus 1000 of FIG. 10) of two or more source UEs, an indication of a first resource allocation for transmitting first data (block 810). For example, the UE (e.g., using transmission component 1004, depicted in FIG. 10) may transmit, to the first source UE, the indication of the first resource allocation for transmitting the first data, as described above.

As further shown in FIG. 8, in some aspects, process 800 may include transmitting, to a second source UE (e.g., another UE 120, source UE 504*a* or source UE 504*b* of FIG. 5, source UE 704*a* or source UE 704*b* of FIG. 7, and/or another apparatus 1000 of FIG. 10) of the two or more source UEs, an indication of a second resource allocation for transmitting second data (block 820). For example, the UE (e.g., using transmission component 1004) may transmit, to the second source UE, the indication of the second resource allocation for transmitting the second data, as described above.

As further shown in FIG. 8, in some aspects, process 800 may include receiving, from the first source UE, the first data using the first resource allocation (block 830). For example, the UE (e.g., using reception component 1002, depicted in FIG. 10) may receive, from the first source UE, the first data using the first resource allocation, as described above.

As further shown in FIG. 8, in some aspects, process 800 may include receiving, from the second source UE, the second data using the second resource allocation (block 840). For example, the UE (e.g., using reception component 1002) may receive, from the second source UE, the second data using the second resource allocation, as described above.

As further shown in FIG. 8, in some aspects, process 800 may include transmitting the first data and the second data to at least one destination UE (e.g., another UE 120, destination UE 506 of FIG. 5, destination UE 706 of FIG. 7, and/or another apparatus 1000 of FIG. 10) (block 850). For example, the UE (e.g., using transmission component 1004) may transmit the first data and the second data to the at least one destination UE, as described above.

Process 800 may include additional aspects, such as any single aspect or any combination of aspects described below and/or in connection with one or more other processes described elsewhere herein.

In a first aspect, the first resource allocation includes one or more resources that do not overlap with one or more resources included in the second resource allocation.

In a second aspect, alone or in combination with the first aspect, the first resource allocation includes one or more resources that overlap with one or more resources included in the second resource allocation.

In a third aspect, alone or in combination with one or more of the first and second aspects, process 800 further includes decoding (e.g., using decoding component 1008, depicted in FIG. 10) the first data and the second data using one or more interference cancellation techniques.

In a fourth aspect, alone or in combination with one or more of the first through third aspects, process 800 further includes receiving (using reception component 1002), from the first source UE, a first report based at least in part on a sidelink channel between the UE and the first source UE, and receiving (using reception component 1002), from the second source UE, a second report based at least in part on a sidelink channel between the UE and the second source UE, such that the first resource allocation and the second resource allocation are each based at least in part on the first report and the second report.

In a fifth aspect, alone or in combination with one or more of the first through fourth aspects, process 800 further includes estimating (e.g., using sensing component 1010, depicted in FIG. 10) resource availability associated with an environment of the UE.

In a sixth aspect, alone or in combination with one or more of the first through fifth aspects, the first resource allocation and the second resource allocation are based at least in part on the resource availability associated with the environment of the UE.

In a seventh aspect, alone or in combination with one or more of the first through sixth aspects, process 800 further includes transmitting (e.g., using transmission component 1004), to the at least one destination UE, an indication of the resource availability associated with the environment of the UE.

In an eighth aspect, alone or in combination with one or more of the first through seventh aspects, the first resource allocation is based, at least in part, on one or more of a priority associated with the first data, a QoS associated with the first data, a TB size associated with the first data, or a reliability associated with the first data.

In a ninth aspect, alone or in combination with one or more of the first through eighth aspects, the first resource allocation includes one or more different frequencies, one or more different time resources, one or more different beams, a different MCS, a different transmit power, a different RV, or a combination thereof, than included in the second resource allocation.

In a tenth aspect, alone or in combination with one or more of the first through ninth aspects, process 800 further includes transmitting (e.g., using transmission component 1004), to the second source UE, an indication that no resources are available, such that the second resource allocation is transmitted after the first data is received.

In an eleventh aspect, alone or in combination with one or more of the first through tenth aspects, process 800 further includes receiving (e.g., using reception component 1002), from the at least one destination UE, an indication of a third resource allocation, such that the first data and the second data are transmitted using the third resource allocation.

In a twelfth aspect, alone or in combination with one or more of the first through eleventh aspects, the first data is transmitted using a different transmit power than the second data.

In a thirteenth aspect, alone or in combination with one or more of the first through twelfth aspects, process 800 further includes transmitting (e.g., using transmission component 1004), to at least one additional UE on the hop, an indication of at least one additional resource allocation for the first source UE, the second source UE, or a combination thereof, to use to communicate with the at least one additional UE.

In a fourteenth aspect, alone or in combination with one or more of the first through thirteenth aspects, process 800 further includes transmitting (e.g., using transmission component 1004), to the at least one additional UE, an indication that the UE is a master node for the hop, where the UE is determined to be the master node based at least in part on a proximity between the UE and at least the first source UE and the second source UE.

In a fifteenth aspect, alone or in combination with one or more of the first through fourteenth aspects, process 800 further includes transmitting (e.g., using transmission component 1004), to the at least one additional UE, an indication that the UE is no longer the master node for the hop.

Figure 11:
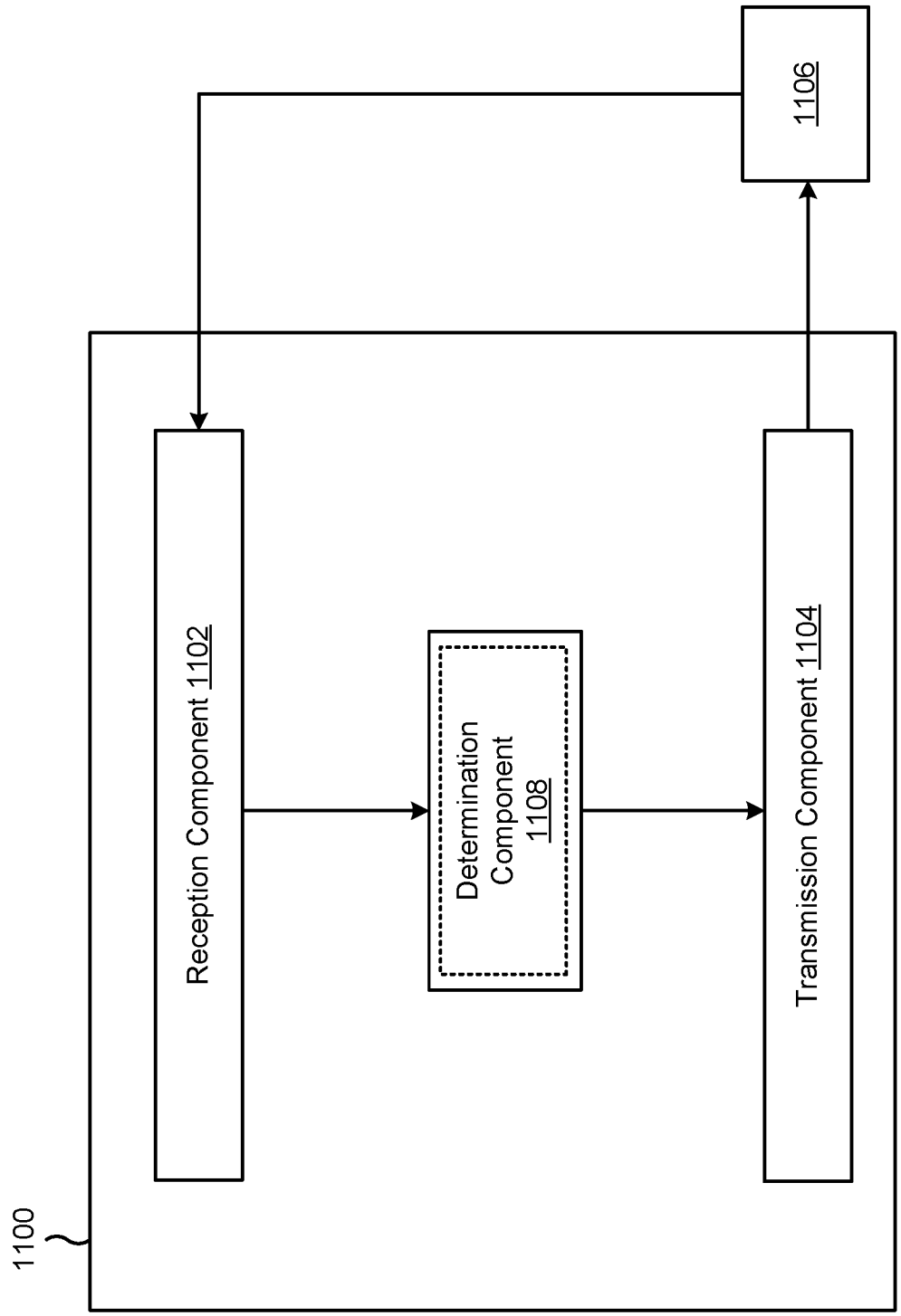

In a sixteenth aspect, alone or in combination with one or more of the first through fifteenth aspects, process 800 further includes receiving (e.g., using reception component 1002), from a controller (e.g., another UE, a base station 110, and/or an apparatus 1100 of FIG. 11), an indication that the UE is a master node for the hop.

In a seventeenth aspect, alone or in combination with one or more of the first through sixteenth aspects, process 800 further includes receiving (e.g., using reception component 1002), from the controller, an indication that the UE is no longer the master node for the hop.

In an eighteenth aspect, alone or in combination with one or more of the first through seventeenth aspects, process 800 further includes transmitting (e.g., using transmission component 1004), to the controller, an indication that the UE is no longer the master node for the hop.

In a nineteenth aspect, alone or in combination with one or more of the first through eighteenth aspects, process 800 further includes receiving (e.g., using reception component 1002), from at least one additional UE on the hop, an indication of the first resource allocation and the second resource allocation.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
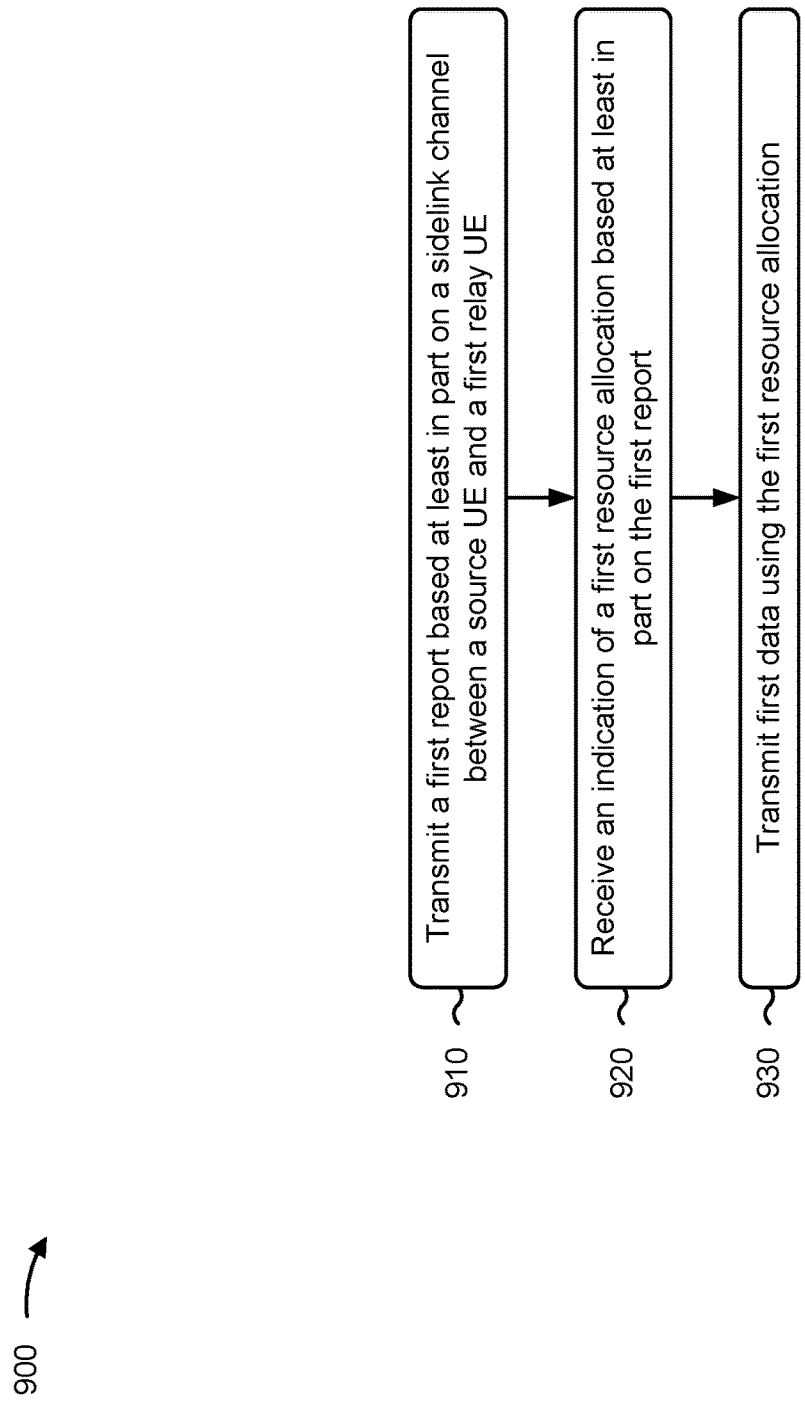

FIG. 9 is a diagram illustrating an example process 900 performed, for example, by a UE, in accordance with the present disclosure. Example process 900 is an example where the UE (e.g., a UE 120, source UE 504*a* or source UE 504*b* of FIG. 5, source UE 704*a* or source UE 704*b* of FIG. 7, and/or an apparatus 1000 of FIG. 10) performs operations associated with using a resource allocation from a relay UE on a hop.

As shown in FIG. 9, in some aspects, process 900 may include transmitting, to a first relay UE (e.g., another UE 120, relay UE 502 of FIG. 5, master relay UE 702*a* or additional relay UE 702*b* of FIG. 7, and/or another apparatus 1000 of FIG. 10), a first report based at least in part on a sidelink channel between the UE and the first relay UE (block 910). For example, the UE (e.g., using transmission component 1004, depicted in FIG. 10) may transmit, to the first relay UE, the first report, as described above.

As further shown in FIG. 9, in some aspects, process 900 may include receiving, from the first relay UE, an indication of a first resource allocation based at least in part on the first report (block 920). For example, the UE (e.g., using reception component 1002, depicted in FIG. 10) may receive, from the first relay UE, the indication of the first resource allocation based at least in part on the first report, as described above.

As further shown in FIG. 9, in some aspects, process 900 may include transmitting, to the first relay UE, first data using the first resource allocation (block 930). For example, the UE (e.g., using transmission component 1004) may transmit, to the first relay UE, the first data using the first resource allocation, as described above.

Process 900 may include additional aspects, such as any single aspect or any combination of aspects described below and/or in connection with one or more other processes described elsewhere herein.

In a first aspect, process 900 further includes estimating (e.g., using sensing component 1010, depicted in FIG. 10) resource availability associated with an environment of the UE, such that the first report is based at least in part on the resource availability.

In a second aspect, alone or in combination with the first aspect, the first resource allocation is based, at least in part, on one or more of a priority associated with the first data, a QoS associated with the first data, a TB size associated with the first data, or a reliability associated with the first data.

In a third aspect, alone or in combination with one or more of the first and second aspects, the first resource allocation includes one or more resources that do not overlap with one or more resources included in a second resource allocation associated with another UE transmitting to the first relay UE.

In a fourth aspect, alone or in combination with one or more of the first through third aspects, the first resource allocation includes one or more resources that overlap with one or more resources included in a second resource allocation associated with another UE transmitting to the first relay UE.

In a fifth aspect, alone or in combination with one or more of the first through fourth aspects, the first resource allocation includes one or more different frequencies, one or more different time resources, one or more different beams, a different MCS, a different transmit power, a different RV, or a combination thereof, than included in a second resource allocation associated with another UE transmitting to the first relay UE.

In a sixth aspect, alone or in combination with one or more of the first through fifth aspects, process 900 further includes receiving (e.g., using reception component 1002), from the first relay UE, an indication that no resources are available, such that the first resource allocation is received after the indication that no resources are available.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a decoding component 1008 or a sensing component 1010, among other examples.

In some aspects, the apparatus 1000 may be configured to perform one or more operations described herein in connection with FIGS. 5A-7B. Additionally, or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

In some aspects, the apparatus 1000 may include a relay UE on a hop or a relay UE on a hop may be included in the apparatus 1000. Accordingly, the transmission component 1004 may transmit, to a first source UE of two or more source UEs, an indication of a first resource allocation for transmitting first data. Additionally, the transmission component 1004 may transmit, to a second source UE of the two or more source UEs, an indication of a second resource allocation for transmitting second data. Accordingly, the reception component 1002 may receive, from the first source UE, the first data using the first resource allocation. Additionally, the reception component 1002 may receive, from the second source UE, the second data using the second resource allocation. The transmission component 1004 may transmit the first data and the second data to at least one destination UE (e.g., included in or as a portion of the apparatus 1006).

In some aspects, the decoding component 1008 may decode the first data and the second data using one or more interference cancellation techniques. The decoding component 1008 may include one or more antennas, a demodulator, a MIMO detector, a receive processor, a controller/processor, a memory, or a combination thereof, of the UE described above in connection with FIG. 2.

In some aspects, the reception component 1002 may receive, from the first source UE, a first report based at least in part on a sidelink channel between the apparatus 1000 and the first source UE. Additionally, the reception component 1002 may receive, from the second source UE, a second report based at least in part on a sidelink channel between the apparatus 1000 and the second source UE. Accordingly, the first resource allocation and the second resource allocation may each be based at least in part on the first report and the second report. Additionally, or alternatively, the sensing component 1010 may estimate resource availability associated with an environment of the apparatus 1000. In some aspects, the sensing component 1010 may include one or more antennas, a demodulator, a MIMO detector, a receive processor, a controller/processor, a memory, or a combination thereof, of the UE described above in connection with FIG. 2. Accordingly, the first resource allocation and the second resource allocation may each be based at least in part on the resource availability. Additionally, or alternatively, the transmission component 1004 may transmit, to the apparatus 1006, an indication of the resource availability associated with the environment of the apparatus 1000.

In some aspects, the transmission component 1004 may transmit, to the second source UE, an indication that no resources are available. Accordingly, the transmission component 1004 may transmit the second resource allocation after the reception component 1002 receives the first data.

In some aspects, the reception component 1002 may receive, from the apparatus 1006, an indication of a third resource allocation. Accordingly, the transmission component 1004 may transmit the first data and the second data using the third resource allocation.

In some aspects, the transmission component 1004 may transmit, to at least one additional UE on the hop, an indication of at least one additional resource allocation for the first source UE, the second source UE, or a combination thereof, to use to communicate with the at least one additional UE. Additionally, in some aspects, the transmission component 1004 may transmit, to the at least one additional UE, an indication that the apparatus 1000 is a master node for the hop. Accordingly, at a later time, the transmission component 1004 may transmit, to the at least one additional UE, an indication that the apparatus 1000 is no longer the master node for the hop. As an alternative, the reception component 1002 may receive, from a controller (e.g., an apparatus 1100 of FIG. 11), an indication that the apparatus 1000 is a master node for the hop. Accordingly, at a later time, the reception component 1002 may receive, from the controller, an indication that the apparatus 1000 is no longer the master node for the hop. Additionally, or alternatively, the transmission component 1004 may transmit, to the controller, an indication that the apparatus 1000 is no longer the master node for the hop.

As an alternative, the reception component 1002 may receive, from at least one additional UE on the hop, an indication of the first resource allocation and the second resource allocation.

In some aspects, the apparatus 1000 may include a source UE or a source UE may be included in the apparatus 1000. Accordingly, the transmission component 1004 may transmit, to a first relay UE, a first report based at least in part on a sidelink channel between the apparatus 1000 and the first relay UE. Additionally, the reception component 1002 may receive, from the first relay UE, an indication of a first resource allocation based at least in part on the first report. Accordingly, the transmission component 1004 may transmit, to the first relay UE, first data using the first resource allocation.

In some aspects, the sensing component 1010 may estimate resource availability associated with an environment of the apparatus 1000. The first report may be based at least in part on the resource availability.

In some aspects, the reception component 1002 may receive, from the first relay UE, an indication that no resources are available. Accordingly, the reception component 1002 may receive the first resource allocation after receiving the indication that no resources are available.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

FIG. 11 is a block diagram of an example apparatus 1100 for wireless communication. The apparatus 1100 may be a controller (e.g., a UE 120, a base station 110, and/or another device controlling one or more UEs on a hop), or a controller may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIGS. 5A-7B. Additionally, or alternatively, the apparatus 1100 may be configured to perform one or more processes described herein, or a combination thereof. In some aspects, the apparatus 1100 and/or one or more components shown in FIG. 11 may include one or more components of the UE or base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE or base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE or base station described above in connection with FIG. 2. In some aspects, the transmission component 1104 may be co-located with the reception component 1102 in a transceiver.

In some aspects, the determination component 1108 may determine that a relay UE (e.g., apparatus 1106) on a hop is to serve as a master node for the hop. In some aspects, the determination component 1108 may include a MIMO detector, a receive processor, a transmit MIMO processor, a transmit processor, a controller/processor, a memory, or a combination thereof, of the UE or base station described above in connection with FIG. 2. The determination component 1108 may use a proximity between the apparatus 1106 and one or more source UEs, as well as one or more proximities between one or more additional relay UEs on the hop and the source UE(s), to determine that the apparatus 1106 should serve as the master node. Accordingly, the transmission component 1104 may transmit, to the apparatus 1106, an indication that the apparatus 1106 is the master node for the hop.

In some aspects, the reception component 1102 may receive, from the apparatus 1106, an indication that the apparatus 1106 is no longer the master node for the hop. Accordingly, the determination component 1108 may determine a new master node for the hop, and the transmission component 1104 may transmit an indication of the new master node.

As an alternative, the transmission component 1104 may transmit, to the apparatus 1106, an indication that the apparatus 1106 is no longer the master node for the hop. For example, the determination component 1108 may determine that a different relay UE on the hop should serve as the master node. Accordingly, the transmission component 1104 may transmit an indication that the different relay UE is the master node.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE) on a hop, comprising:

transmitting, to a first source UE of two or more source UEs, an indication of a first resource allocation for transmitting first data; transmitting, to a second source UE of the two or more source UEs, an indication of a second resource allocation for transmitting second data; receiving, from the first source UE, the first data using the first resource allocation; receiving, from the second source UE, the second data using the second resource allocation; and transmitting the first data and the second data to at least one destination UE.

Aspect 2: The method of Aspect 1, wherein the first resource allocation includes one or more resources that do not overlap with one or more resources included in the second resource allocation.

Aspect 3: The method of any one of Aspects 1 through 2, wherein the first resource allocation includes one or more resources that overlap with one or more resources included in the second resource allocation.

Aspect 4: The method of Aspect 3, further comprising: decoding the first data and the second data using one or more interference cancellation techniques.

Aspect 5: The method of any one of Aspects 1 through 4, further comprising: receiving, from the first source UE, a first report based at least in part on a sidelink channel between the UE and the first source UE; and receiving, from the second source UE, a second report based at least in part on a sidelink channel between the UE and the second source UE, wherein the first resource allocation and the second resource allocation are each based at least in part on the first report and the second report.

Aspect 6: The method of any one of Aspects 1 through 5, further comprising: estimating resource availability associated with an environment of the UE.

Aspect 7: The method of Aspect 6, wherein the first resource allocation and the second resource allocation are based at least in part on the resource availability associated with the environment of the UE.

Aspect 8: The method of any one of Aspects 6 through 7, further comprising: transmitting, to the at least one destination UE, an indication of the resource availability associated with the environment of the UE.

Aspect 9: The method of any one of Aspects 1 through 8, wherein the first resource allocation is based, at least in part, on one or more of a priority associated with the first data, a quality of service associated with the first data, a transport block size associated with the first data, or a reliability associated with the first data.

Aspect 10: The method of any one of Aspects 1 through 9, wherein the first resource allocation includes one or more different frequencies, one or more different time resources, one or more different beams, a different modulation and coding scheme, a different transmit power, a different redundancy version, or a combination thereof, than included in the second resource allocation.

Aspect 11: The method of any one of Aspects 1 through 10, further comprising: transmitting, to the second source UE, an indication that no resources are available, wherein the second resource allocation is transmitted after the first data is received.

Aspect 12: The method of any one of Aspects 1 through 11, further comprising: receiving, from the at least one destination UE, an indication of a third resource allocation, wherein the first data and the second data are transmitted using the third resource allocation.

Aspect 13: The method of any one of Aspects 1 through 12, wherein the first data is transmitted using a different transmit power than the second data.

Aspect 14: The method of any one of Aspects 1 through 13, further comprising: transmitting, to at least one additional UE on the hop, an indication of at least one additional resource allocation for the first source UE, the second source UE, or a combination thereof, to use to communicate with the at least one additional UE.

Aspect 15: The method of Aspect 14, further comprising: transmitting, to the at least one additional UE, an indication that the UE is a master node for the hop, wherein the UE is determined to be the master node based at least in part on a proximity between the UE and at least the first source UE and the second source UE.

Aspect 16: The method of Aspect 15, further comprising: transmitting, to the at least one additional UE, an indication that the UE is no longer the master node for the hop.

Aspect 17: The method of any one of Aspects 14 through 16, further comprising: receiving, from a controller, an indication that the UE is a master node for the hop.

Aspect 18: The method of Aspect 17, further comprising: receiving, from the controller, an indication that the UE is no longer the master node for the hop.

Aspect 19: The method of Aspect 17, further comprising: transmitting, to the controller, an indication that the UE is no longer the master node for the hop.

Aspect 20: The method of any one of Aspects 1 through 13, further comprising: receiving, from at least one additional UE on the hop, an indication of the first resource allocation and the second resource allocation.

Aspect 21: A method of wireless communication performed by a user equipment (UE), comprising: transmitting, to a first relay UE, a first report based at least in part on a sidelink channel between the UE and the first relay UE; receiving, from the first relay UE, an indication of a first resource allocation based at least in part on the first report; and transmitting, to the first relay UE, first data using the first resource allocation.

Aspect 22: The method of Aspect 21, further comprising: estimating resource availability associated with an environment of the UE, wherein the first report is based at least in part on the resource availability.

Aspect 23: The method of any one of Aspects 21 through 22, wherein the first resource allocation is based, at least in part, on one or more of a priority associated with the first data, a quality of service associated with the first data, a transport block size associated with the first data, or a reliability associated with the first data.

Aspect 24: The method of any one of Aspects 21 through 23, wherein the first resource allocation includes one or more resources that do not overlap with one or more resources included in a second resource allocation associated with another UE transmitting to the first relay UE.

Aspect 25: The method of any one of Aspects 21 through 24, wherein the first resource allocation includes one or more resources that overlap with one or more resources included in a second resource allocation associated with another UE transmitting to the first relay UE.

Aspect 26: The method of any one of Aspects 21 through 25, wherein the first resource allocation includes one or more different frequencies, one or more different time resources, one or more different beams, a different modulation and coding scheme, a different transmit power, a different redundancy version, or a combination thereof, than included in a second resource allocation associated with another UE transmitting to the first relay UE.

Aspect 27: The method of any one of Aspects 21 through 26, further comprising: receiving, from the first relay UE, an indication that no resources are available, wherein the first resource allocation is received after the indication that no resources are available.

Aspect 28: An apparatus for wireless communication at a device, comprising a processor; memory coupled with the processor; and instructions stored in the memory and executable by the processor to cause the apparatus to perform the method of one or more Aspects of Aspects 1-20.

Aspect 29: A device for wireless communication, comprising a memory and one or more processors coupled to the memory, the memory and the one or more processors configured to perform the method of one or more Aspects of Aspects 1-20.

Aspect 30: An apparatus for wireless communication, comprising at least one means for performing the method of one or more Aspects of Aspects 1-20.

Aspect 31: A non-transitory computer-readable medium storing code for wireless communication, the code comprising instructions executable by a processor to perform the method of one or more Aspects of Aspects 1-20.

Aspect 32: A non-transitory computer-readable medium storing a set of instructions for wireless communication, the set of instructions comprising one or more instructions that, when executed by one or more processors of a device, cause the device to perform the method of one or more Aspects of Aspects 1-20.

Aspect 33: An apparatus for wireless communication at a device, comprising a processor; memory coupled with the processor; and instructions stored in the memory and executable by the processor to cause the apparatus to perform the method of one or more Aspects of Aspects 21-27.

Aspect 34: A device for wireless communication, comprising a memory and one or more processors coupled to the memory, the memory and the one or more processors configured to perform the method of one or more Aspects of Aspects 21-27.

Aspect 35: An apparatus for wireless communication, comprising at least one means for performing the method of one or more Aspects of Aspects 21-27.

Aspect 36: A non-transitory computer-readable medium storing code for wireless communication, the code comprising instructions executable by a processor to perform the method of one or more Aspects of Aspects 21-27.

Aspect 37: A non-transitory computer-readable medium storing a set of instructions for wireless communication, the set of instructions comprising one or more instructions that, when executed by one or more processors of a device, cause the device to perform the method of one or more Aspects of Aspects 21-27.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication on a hop, comprising:
one or more memories; and
one or more processors coupled to the one or more memories, the one or more processors configured to:
transmit, to a first source UE, an indication of one or more first resources for transmitting first data to the UE,
wherein the one or more first resources are based at least in part on a resource availability of the first source UE and a resource availability of a second source UE;

transmit, to the second source UE, an indication of one or more second resources for transmitting second data to the UE,
wherein the one or more second resources are based at least in part on the resource availability of the first source UE and the resource availability of the second source UE;
receive the first data using the one or more first resources and the second data using the one or more second resources; and
transmit the first data and the second data to at least one destination UE.

2. The UE of claim 1, wherein the one or more first resources include one or more resources that do not overlap with the one or more second resources.

3. The UE of claim 1, wherein the one or more first resources include one or more resources that overlap with the one or more second resources.

4. The UE of claim 1, wherein the one or more processors are further configured to:
decode the first data and the second data using one or more interference cancellation techniques.

5. The UE of claim 1, wherein:
the resource availability of the first source UE is based at least in part on a sidelink channel between the UE and the first source UE, and
the resource availability of the second source UE is based at least in part on a sidelink channel between the UE and the second source UE.

6. The UE of claim 1, wherein the one or more processors are further configured to:
estimate resource availability associated with an environment of the UE.

7. The UE of claim 6, wherein the one or more first resources and the one or more second resources are based at least in part on the resource availability associated with the environment of the UE.

8. The UE of claim 6, wherein the one or more processors are further configured to:
transmit, to the at least one destination UE, an indication of the resource availability associated with the environment of the UE.

9. The UE of claim 1, wherein the one or more first resources are based, at least in part, on one or more of a priority associated with the first data, a quality of service associated with the first data, a transport block size associated with the first data, or a reliability associated with the first data.

10. The UE of claim 1, wherein the one or more first resources are associated with one or more different frequencies, one or more different time resources, one or more different beams, a different modulation and coding scheme, a different transmit power, a different redundancy version, or a combination thereof, than associated with the one or more second resources.

11. The UE of claim 1, wherein the one or more processors are further configured to:
transmit, to the second source UE, an indication that no resources are available,
wherein the indication of the one or more second resources is transmitted after the first data is received.

12. The UE of claim 1, wherein the one or more processors are further configured to:
receive, from the at least one destination UE, an indication of one or more third resources,
wherein the first data and the second data are transmitted using the one or more third resources.

13. The UE of claim 12, wherein the first data is transmitted using a different transmit power than the second data.

14. The UE of claim 1, wherein the one or more processors are further configured to:
transmit, to at least one additional UE on the hop, an indication of at least one or more additional resources for the first source UE, the second source UE, or a combination thereof, to use to communicate with the at least one additional UE.

15. The UE of claim 14, wherein the one or more processors are further configured to:
transmit, to the at least one additional UE, an indication that the UE is a master node for the hop,
wherein the UE is determined to be the master node based at least in part on a proximity between the UE and at least the first source UE and the second source UE.

16. The UE of claim 15, wherein the one or more processors are further configured to:
transmit, to the at least one additional UE, an indication that the UE is no longer the master node for the hop.

17. The UE of claim 14, wherein the one or more processors are further configured to:
receive, from a controller, an indication that the UE is a master node for the hop.

18. The UE of claim 17, wherein the one or more processors are further configured to:
receive, from the controller, an indication that the UE is no longer the master node for the hop.

19. The UE of claim 17, wherein the one or more processors are further configured to:
transmit, to the controller, an indication that the UE is no longer the master node for the hop.

20. The UE of claim 1, wherein the one or more processors are further configured to:
receive, from at least one additional UE on the hop, an indication of the one or more first resources and the one or more second resources.

21. A method of wireless communication performed by a user equipment (UE) on a hop, comprising:
transmitting, to a first source UE, an indication of one or more first resources for transmitting first data to the UE,
wherein the one or more first resources are based at least in part on a resource availability of the first source UE and a resource availability of a second source UE;
transmitting, to the second source UE, an indication of one or more second resources for transmitting second data to the UE,
wherein the one or more second resources are based at least in part on the resource availability of the first source UE and the resource availability of the second source UE;
receiving the first data using the one or more first resources and the second data using the one or more second resources; and
transmitting the first data and the second data to at least one destination UE.

22. The method of claim 21, wherein:
the resource availability of the first source UE is based at least in part on a sidelink channel between the UE and the first source UE, and
the resource availability of the second source UE is based at least in part on a sidelink channel between the UE and the second source UE.

* * * * *